(12) United States Patent
Na et al.

(10) Patent No.: US 11,847,278 B2
(45) Date of Patent: Dec. 19, 2023

(54) DISPLAY DEVICE PREDICTING NOISE FOR TOUCH SENSOR AND COMPUTING SYSTEM

(71) Applicant: SAMSUNG ELECTRONICS CO., LTD., Suwon-si (KR)

(72) Inventors: Sewhan Na, Seoul (KR); Jiheon Ok, Hwaseong-si (KR); Unki Park, Suwon-si (KR); Jaeyoul Lee, Seongnam-si (KR); Hyunwook Lim, Seoul (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 0 days.

(21) Appl. No.: 17/747,521

(22) Filed: May 18, 2022

(65) Prior Publication Data

US 2023/0134597 A1  May 4, 2023

(30) Foreign Application Priority Data

Nov. 3, 2021  (KR) .......................... 10-2021-0149389

(51) Int. Cl.
*G06F 3/041* (2006.01)
*G09G 3/20* (2006.01)

(52) U.S. Cl.
CPC ........ *G06F 3/04182* (2019.05); *G06F 3/0412* (2013.01); *G09G 3/2092* (2013.01); *G09G 2300/0842* (2013.01); *G09G 2310/0297* (2013.01)

(58) Field of Classification Search
CPC ...... G06F 3/041–047; G06F 2203/041–04114; G06F 3/04182; H10K 59/40; G06N 3/02; G06N 3/048; G06N 3/063; G06N 7/01; G06N 3/045; G06T 2207/20084
See application file for complete search history.

(56) References Cited

U.S. PATENT DOCUMENTS

| | | | |
|---|---|---|---|
| 9,535,526 B2 | 1/2017 | Goo et al. | |
| 9,684,407 B2 | 6/2017 | Vanga | |
| 10,949,022 B2 | 3/2021 | Lee | |
| 11,150,765 B2 | 10/2021 | Lee et al. | |
| 2011/0057890 A1 | 3/2011 | Goo et al. | |
| 2013/0009888 A1* | 1/2013 | Park ...................... | G06F 3/0421 345/173 |
| 2013/0285965 A1 | 10/2013 | Goo et al. | |

(Continued)

FOREIGN PATENT DOCUMENTS

| | | |
|---|---|---|
| KR | 10-1657215 | 9/2016 |
| KR | 10-2019-0104101 | 9/2019 |
| KR | 10-2020-0113060 | 10/2020 |

*Primary Examiner* — Sanjiv D. Patel
(74) *Attorney, Agent, or Firm* — F. Chau & Associates, LLC

(57) ABSTRACT

A display device includes a display panel, a touch sensor, a display driver and a touch controller. The display driver drives the display panel based on input image data, and generates predicted noise data corresponding to the input image data by using an artificial neural network. The touch controller receives a touch sensing signal from the touch sensor by driving the touch sensor, converts the touch sensing signal that is an analog signal into touch sensing data that are digital data, and compensates the touch sensing data based on the predicted noise data.

20 Claims, 20 Drawing Sheets

(56) References Cited

U.S. PATENT DOCUMENTS

| | | |
|---|---|---|
| 2021/0049474 A1 | 2/2021 | Son et al. |
| 2021/0097927 A1* | 4/2021 | Matsueda ............ G09G 3/3275 |
| 2021/0117025 A1 | 4/2021 | Huang et al. |
| 2021/0150306 A1 | 5/2021 | Lin et al. |
| 2022/0019311 A1* | 1/2022 | Seyed Mousavi .... G06F 18/251 |
| 2022/0365620 A1* | 11/2022 | Pundak .................. G06N 3/044 |

* cited by examiner

DISPLAY DEVICE PREDICTING NOISE FOR TOUCH SENSOR AND COMPUTING SYSTEM

CROSS-REFERENCE TO RELATED APPLICATION

This U.S. non-provisional patent application claims priority under 35 USC § 119 to Korean Patent Application No. 10-2021-0149389, filed on Nov. 3, 2021 in the Korean Intellectual Property Office (KIPO), the disclosure of which is incorporated by reference in its herein.

1. TECHNICAL FIELD

Example embodiments relate generally to a semiconductor integrated circuit, and more particularly to a display device and a computing system that predict a noise for a touch sensor by using an artificial neural network.

2. DISCUSSION OF RELATED ART

Touch sensors are widely used in electronic devices to detect an input action or an event by a user. Typically, a touch sensor detects the presence and location of a user's touch by generating an electrical signal when the touch sensor is touched by a finger, a stylus pen, etc. The touch sensor may be classified into a resistive touch sensor, a capacitive touch sensor, an electromagnetic touch sensor, an infrared touch sensor, a surface acoustic wave (SAW) touch sensor, a near field imaging (NFI) touch sensor, etc. Among these various types of touch sensors, the capacitive touch sensor has been most widely used because of its rapid response speed and thin profile.

The touch sensor may be mounted on a display panel, such as an organic light emitting diode (OLED) display panel, a liquid crystal display (LCD) panel, etc., or may be formed within the display panel. However, noise in the touch sensor caused by driving of the display panel may reduce the accuracy of the touch sensor.

SUMMARY

At least one example embodiment of the present disclosure provides a display device including a touch sensor that uses an artificial neural network for predicting noise in the touch panel and compensates for the noise by adjusting data sensed by the touch sensor based on the predicted noise.

At least one example embodiment of the present disclosure provides a computing system for predicting noise in a touch sensor using an artificial neural network and compensating for the noise by adjusting data sensed by the touch sensor based on the predicted noise.

According to an example embodiment, a display device includes a display panel, a touch sensor, a display driver and a touch controller. The display driver drives the display panel based on input image data, and generates predicted noise data corresponding to the input image data by using an artificial neural network. The touch controller receives a touch sensing signal from the touch sensor by driving the touch sensor, converts the touch sensing signal (e.g., an analog signal) into touch sensing data (e.g., digital data), and compensates the touch sensing data based on the predicted noise data.

According to an example embodiment, a display device includes a display panel including a plurality of pixels, a touch sensor including a plurality of driving lines and a plurality of sensing lines, a display driver configured to drive the display panel based on input image data, and a touch controller configured to drive the touch sensor. The display driver includes a data driver configured to generate a display driving signal based on the input image data, and to provide the display driving signal to the display panel, a preprocessor configured to group the plurality of pixels into a plurality of pixel blocks corresponding to a plurality of sensing units defined by the plurality of driving lines and the plurality of sensing lines, and to generate a current map representing block current amounts of the plurality of pixel blocks based on the input image data, a storage device configured to store a base parameter set that is common to a plurality of scenarios, and a plurality of fine tuning parameter sets respectively corresponding to the plurality of scenarios, and a logic circuit including an artificial neural network having a base layer and a fine tuning layer. The logic circuit is configured to select one scenario from the plurality of scenarios based on at least one of display driving information and touch driving information, to apply the base parameter set to the base layer, to apply a fine tuning parameter set corresponding to the one scenario among the plurality of fine tuning parameter sets to the fine tuning layer, and to generate predicted noise data by applying the current map to the artificial neural network. The touch controller includes a touch driver configured to provide a touch driving signal to the plurality of driving lines, a touch receiver configured to receive a touch sensing signal from the plurality of sensing lines, and to convert the touch sensing signal into the touch sensing data, a compensator configured to receive the predicted noise data from the display driver, and to compensate the touch sensing data based on the predicted noise data, and a touch processor configured to generate touch coordinate data representing a touch position based on the compensated touch sensing data.

According to an example embodiment, a computing system includes a display device configured to display an image based on input image data, and to generate touch sensing data, and a host processor configured to provide the input image data to the display device, and to receive the touch sensing data from the display device. The host processor generates predicted noise data corresponding to the input image data by using an artificial neural network, and compensates the touch sensing data based on the predicted noise data.

As described above, a display device and a computing system according to example embodiments may generate predicted noise data corresponding to input image data by using an artificial neural network, and may compensate touch sensing data based on the predicted noise data. Accordingly, a noise in a touch sensor caused by driving of a display panel may be accurately predicted and removed.

BRIEF DESCRIPTION OF THE DRAWINGS

Illustrative, non-limiting example embodiments will be more clearly understood from the following detailed description taken in conjunction with the accompanying drawings.

DETAILED DESCRIPTION OF THE EMBODIMENTS

Figure 1:
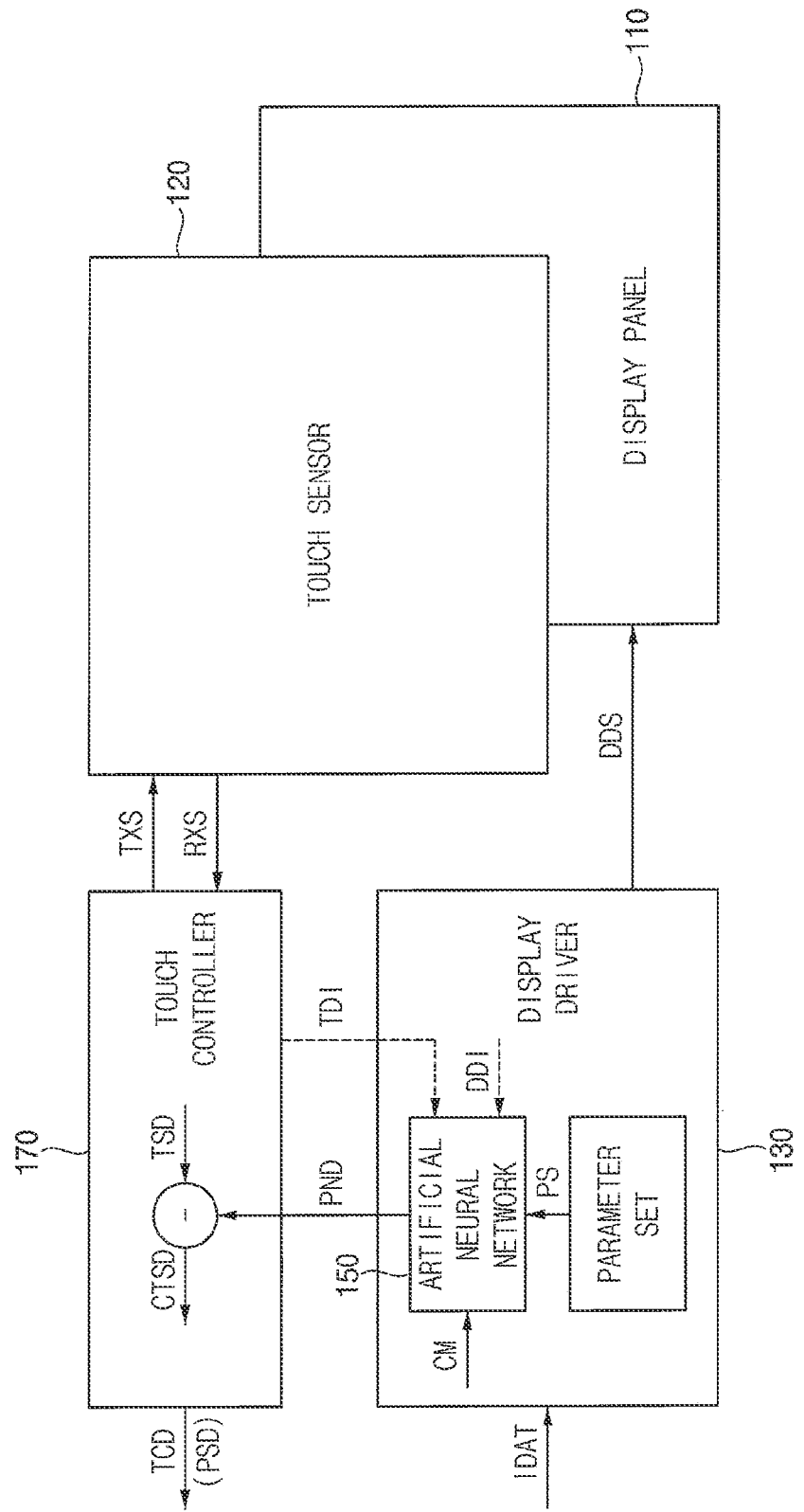
FIG. 1 is a block diagram illustrating a display device according to an example embodiment.

Various example embodiments will be described more fully with reference to the accompanying drawings, in which embodiments are shown. The present disclosure may, however, be embodied in many different forms and should not be construed as limited to the embodiments set forth herein. Like reference numerals refer to like elements throughout this application.

FIG. 1 is a block diagram illustrating a display device according to an example embodiment.

Referring to FIG. 1, a display device 100 may include a display panel 110, a touch sensor 120, a display driver 130 (e.g., a driver circuit) and a touch controller 170 (e.g., a control circuit).

The display panel 110 may include a plurality of pixels, and may display an image. For example, the display panel 110 may receive a display driving signal DDS from the display driver 130, and may display an image in response to the display driving signal DDS.

The touch sensor 120 may include a plurality of driving lines and a plurality of sensing lines, and may detect a presence, a proximity and/or a position of a touch. In an example embodiment, the touch sensor 120 is a capacitive touch sensor, but is not limited thereto.

According to an example embodiment, the touch sensor 120 may be an add-on type touch sensor that is attached on the display panel 110, or an embedded type touch sensor formed within or integrated with the display panel 110. For example, the touch sensor 120 may be, but is not limited to, an on-cell type embedded touch sensor, or an in-cell type embedded touch sensor. Since the touch sensor 120 is formed on or within the display panel 110, the display panel 110 and the touch sensor 120 may be implemented with a single panel, and the single panel may be referred to as a touch screen panel (TSP).

The display driver 130 may receive input image data IDAT from a host processor (e.g., an application processor (AP), a graphics processing unit (GPU), or a graphics card), and may drive the display panel 110 based on the input image data IDAT. For example, the display driver 130 may generate the display driving signal DDS corresponding to the input image data IDAT, and may provide the display driving signal DDS to the display panel 110 to display an image.

In an embodiment, the display driver 130 includes an artificial neural network 150, and predicts a noise in the touch sensor 120 caused by driving of the display panel 110 by using the artificial neural network 150. To predict the noise, the display driver 130 may generate predicted noise data PND corresponding to the input image data IDAT by using the artificial neural network 150. In an example embodiment, the display driver 130 converts the input image data IDAT into a current map CM, and generates the predicted noise data PND from the current map CM by using the artificial neural network 150. The predicted noise data PND may correspond to the noise in the touch sensor 120 caused by the driving of the display panel 110. In an example embodiment, the display driver 130 stores a parameter set PS for the artificial neural network 150, and generates the predicted noise data PND by applying the current map CM to the artificial neural network 150 having the parameter set PS.

The touch controller 170 may receive a touch sensing signal RXS from the touch sensor 120 by driving the touch sensor 120. For example, the touch controller 170 may provide a touch driving signal TXS to the plurality of driving lines of the touch sensor 120. If the touch driving signal TXS is applied to the plurality of driving lines, the touch sensing signal RXS may be induced at the plurality of sensing lines of the touch sensor 120 by capacitive coupling between the plurality of driving lines and the plurality of sensing lines. The touch controller 170 may receive the touch sensing signal RXS through the plurality of sensing lines.

The touch controller 170 may convert the touch sensing signal RXS that is an analog signal into touch sensing data TSD that are digital data. Since the touch sensor 120 is formed on or within the display panel 110, when the display panel 110 is driven to display an image, due to coupling between an electrode of the display panel 110 and an electrode of the touch sensor 120, the touch sensing signal RXS of the touch sensor 120 may have a noise component caused by the driving of the display panel 110, and the touch sensing data TSD converted from the touch sensing signal RXS also may have the noise component. However, in the display device 100 according to an example embodiment, the touch controller 170 may receive the predicted noise data PND generated using the artificial neural network 150 from the display driver 130, and may compensate or adjust the touch sensing data TSD based on the predicted noise data PND. In an example embodiment, the touch controller 170 generates the compensated touch sensing data CTSD by subtracting the predicted noise data PND from the touch sensing data TSD. The compensated touch sensing data CTSD may have no noise component, or may have less noise component.

The touch controller 170 may generate touch coordinate data TCD representing a touch position based on the compensated touch sensing data CTSD. For example, in a case where a conductive object touches the touch sensor 120, or is in proximity to the touch sensor 120, a mutual capacitance between the plurality of driving lines and the plurality of sensing lines may be changed, and the touch sensing signal RXS and the compensated touch sensing data CTSD generated from the touch sensing signal RXS also may be changed by the change of the mutual capacitance. The touch controller 170 may detect the touch and/or the proximity of the conductive object based on the change of the compensated touch sensing data CTSD. Since the compensated touch sensing data CTSD have no noise component or less noise component, the touch controller 170 may more accurately detect the touch and/or the proximity of the conductive object. In an example embodiment, based on the compensated touch sensing data CTSD, the touch controller 170 may generate not only the touch coordinate data TCD representing a position of the touch of the conductive object, but also proximity sensing data PSD representing the proximity of the conductive object.

To reduce a noise in a touch sensor caused by driving of a display panel, the touch sensor may be driven only in a period in which a display driving signal is not provided to the display panel, or only in a vertical blank period. In this case, not only a touch reporting rate may be reduced, but also the noise may still be caused by a current flowing through the display panel. A noise voltage of an electrode (e.g., an electrode of a low power supply voltage (ELVSS)) of a display panel may be sensed by using a touch driving line in an inactive state. In this case, only a noise at a position of sensing the noise voltage may be removed, and a noise component of an entire region of a touch sensor may not be accurately removed. However, the display device 100 according to an example embodiment predicts noise in the touch sensor 120 caused by the driving of the display panel 110 by using the artificial neural network 150. Accordingly, in the display device 100 according to an example embodiment, the noise for the touch sensor 120 caused by the driving of the display panel 110 may be accurately predicted and removed.

Figure 2:
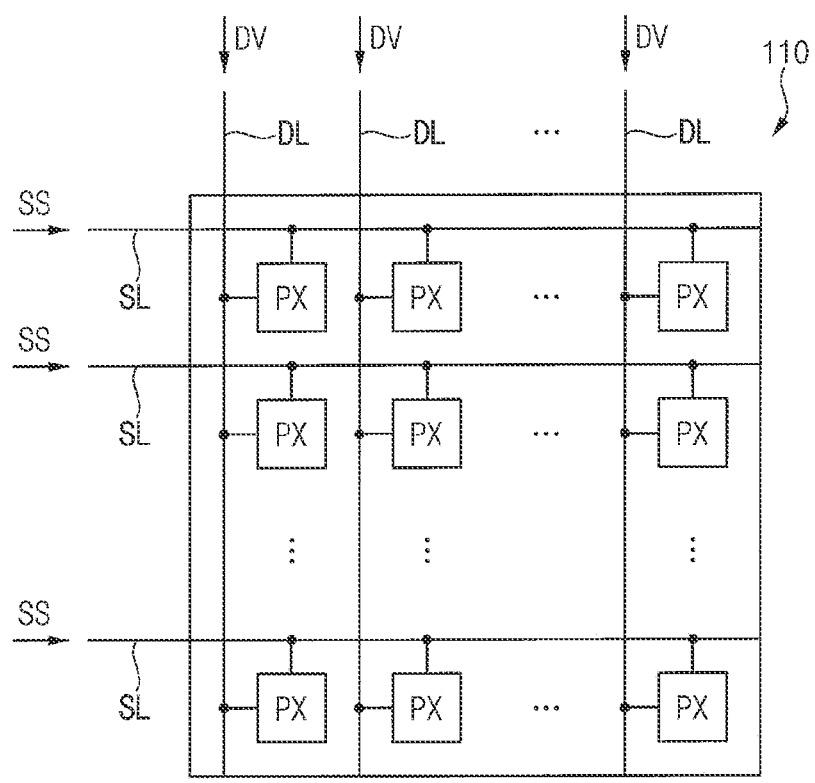
FIG. 2 is a diagram illustrating an example of a display panel according to an example embodiment.
Figure 3:
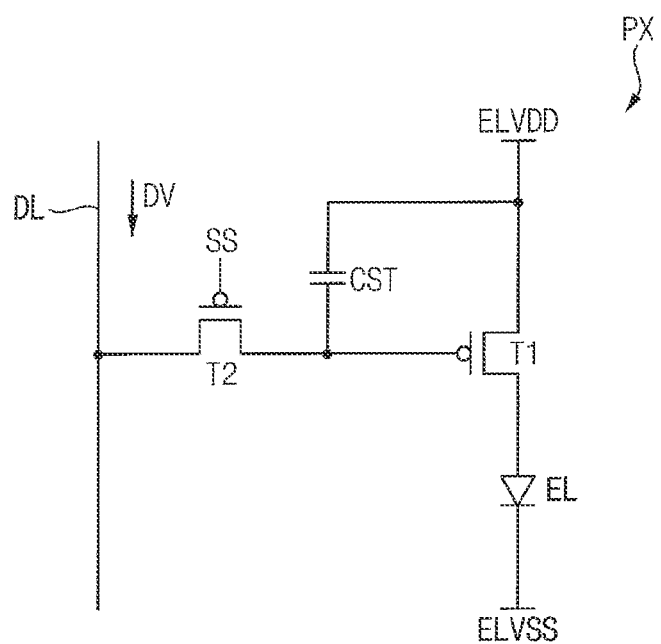
FIG. 3 is a circuit diagram illustrating an example of a pixel according to an example embodiment.

FIG. 2 is a diagram illustrating an example of a display panel according to an example embodiment, and FIG. 3 is a circuit diagram illustrating an example of a pixel according to an example embodiment.

Referring to FIG. 2, a display panel 110 may include a plurality of data lines DL, a plurality of scan lines SL, and a plurality of pixels PX connected thereto. The plurality of pixels PX may receive data voltages DV through the plurality of data lines DL, may receive scan signals SS through the plurality of scan lines SL, and may display an image based on the data voltages DV and the scan signals SS. In some example embodiments, the display panel 110 may receive the data voltages DV and the scan signals SS as a display driving signal DDS from a display driver 130 illustrated in FIG. 1. In other example embodiments, the display panel 110 may receive the data voltages DV as the display driving signal DDS from the display driver 130 illustrated in FIG. 1, and a scan driver generates the scan signals SS applied to the scan lines line SL.

In some example embodiments, each pixel PX may include a light emitting element (e.g., a self-luminous element), and a display panel 110 may be a light emitting display panel. For example, as illustrated in FIG. 3, each pixel PX may include a scan transistor T2 that transfers the data voltage DV of the data line DL in response to the scan signal SS, a storage capacitor CST that stores the data voltage DV transferred by the scan transistor T2, a driving transistor T1 that generates a driving current based on the data voltage DV stored in the storage capacitor CST, and a light emitting element EL that emits light based on the driving current flowing from a line of a high power supply voltage ELVDD to a line of a low power supply voltage ELVSS. In an example embodiment, the light emitting element EL is an organic light emitting diode (OLED), but is not limited thereto. In other example embodiments, the light emitting element EL may be any suitable light emitting element, such as a nano light emitting diode (NED), a quantum dot (QD) light emitting diode, a micro light emitting diode, an inorganic light emitting diode, or the like. Although FIG. 3 illustrates an example where each pixel PX has a 2T1C structure including two transistors T1 and T2 and one capacitor CST, a structure of the pixel PX according to example embodiments is not limited to the 2T1C structure.

In other example embodiments, the display panel 110 is not limited to the light emitting display panel, and may be any suitable display panel, such as a liquid crystal display (LCD) panel, a field emission display (FED) panel, or the like.

Figure 4:
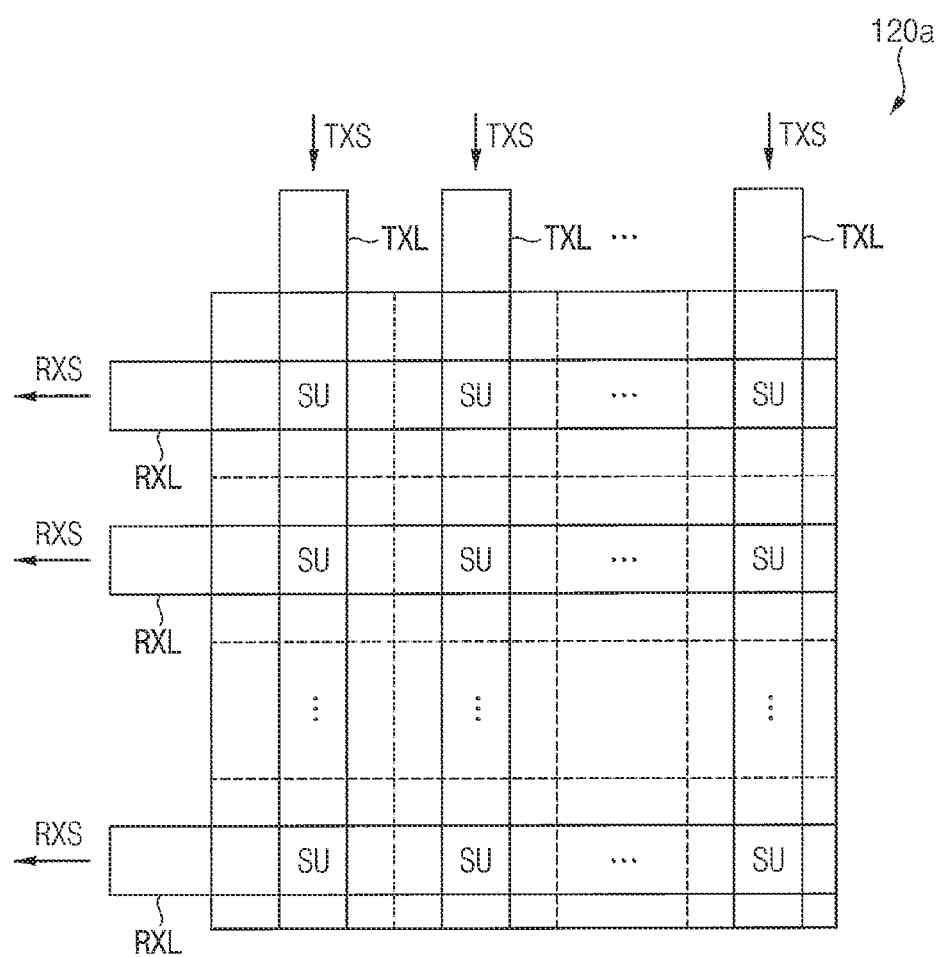
FIG. 4 is a diagram illustrating an example of a touch sensor according to an example embodiment.

FIG. 4 is a diagram illustrating an example of a touch sensor according to example an embodiment.

Referring to FIG. 4, a touch sensor 120a may include a plurality of driving lines TXL and a plurality of sensing lines RXL. The plurality of driving lines TXL may receive a touch driving signal TXS. The touch sensor 120 of FIG. 1 may be implemented by the touch sensor 120a. In some example embodiments, the plurality of driving lines TXL may sequentially receive the touch driving signal TXS. If the touch driving signal TXS is applied to the plurality of driving lines TXL, the touch sensing signal RXS may be induced at the plurality of sensing lines RXL by capacitive coupling between the plurality of driving lines TXL and the plurality of sensing lines RXL. The plurality of sensing lines RXL may provide the touch driving signal TXS to a touch controller (e.g., 170).

A plurality of sensing units SU of the touch sensor 120a may be defined by the plurality of driving lines TXL and the plurality of sensing lines RXL. For example, as illustrated in FIG. 4, the plurality of sensing units SU may be defined at points of intersection between the plurality of driving lines TXL and the plurality of sensing lines RXL. A touch and/or a proximity of a conductive object may be detected by detecting a change of a mutual capacitance between the plurality of driving lines TXL and the plurality of sensing lines RXL, or by detecting a change of the mutual capacitance of the plurality of sensing units SU.

Figure 5:
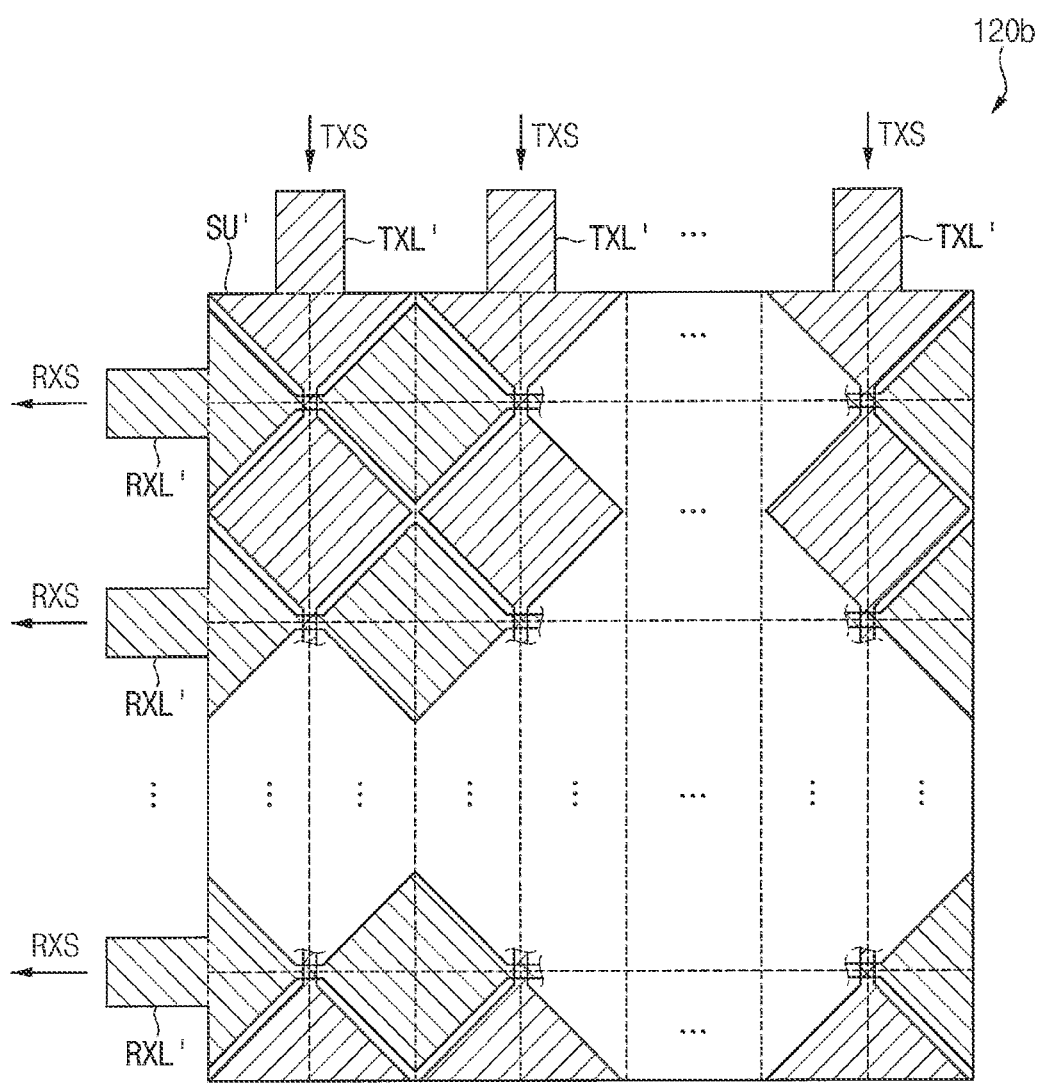
FIG. 5 is a diagram illustrating another example of a touch sensor according to an example embodiment.

FIG. 5 is a diagram illustrating another example of a touch sensor according to an example embodiment.

Referring to FIG. 5, a touch sensor 120b may include a plurality of driving lines TXL' and a plurality of sensing lines RXL'. The touch sensor 120 of FIG. 1 may be implemented by the touch sensor 120b. The touch sensor 120b of FIG. 5 may have a similar configuration and a similar operation to a touch sensor 120a of FIG. 4, except that electrodes of each driving line TXL' and electrodes of each sensing line RXL' may have a diamond shape, and the plurality of driving lines TXL' and the plurality of sensing lines RXL' may be located at substantially the same layer.

A plurality of sensing units SU' of the touch sensor 120b may be defined by the plurality of driving lines TXL' and the plurality of sensing lines RXL'. For example, as illustrated in FIG. 5, each sensing unit SU' may be defined by adjacent electrodes of corresponding driving and sensing lines TXL' and RXL'. A touch and/or a proximity of a conductive object may be detected by detecting a change of a mutual capacitance between the adjacent electrodes of the corresponding driving and sensing lines TXL' and RXL', or by detecting a change of the mutual capacitance of each sensing unit SU'.

Figure 6:
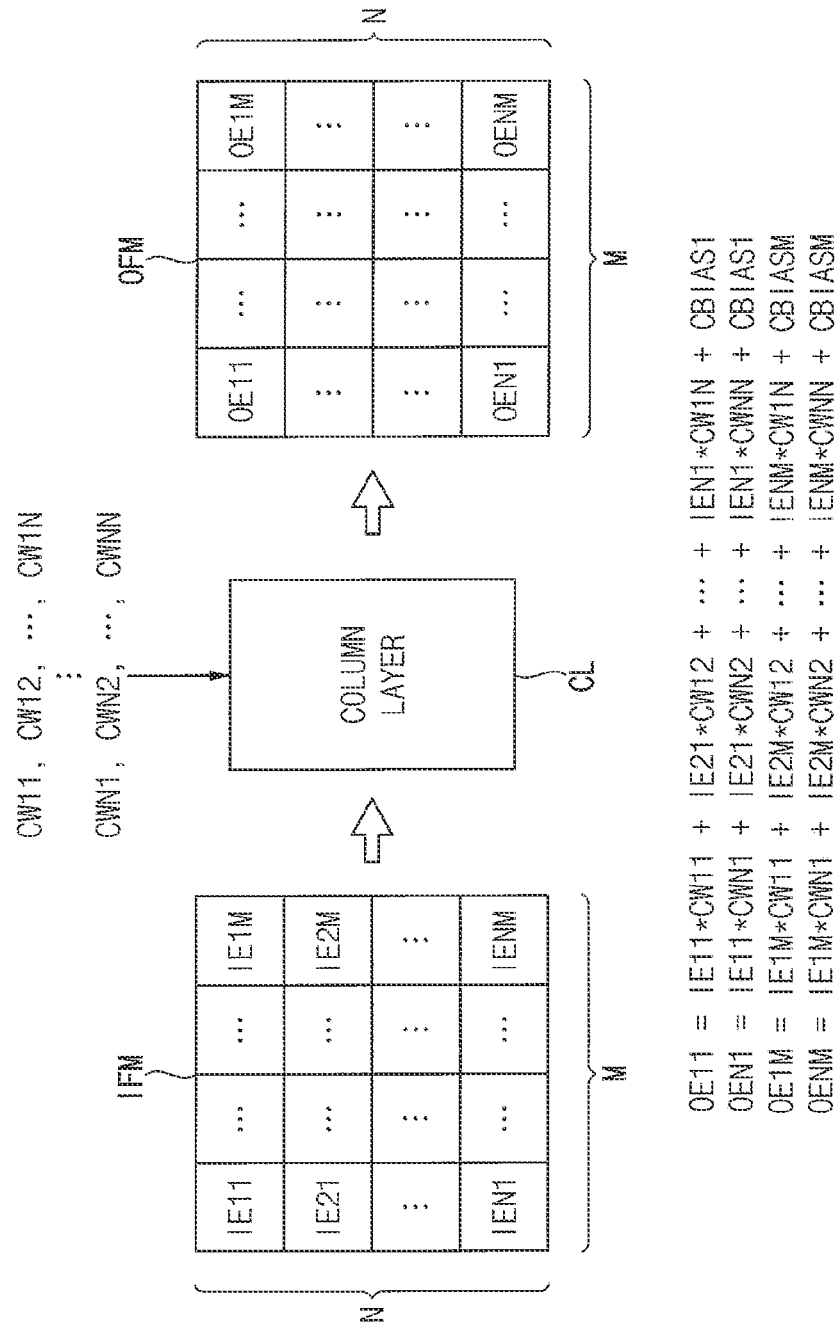
FIG. 6 is a diagram for describing an example of a column direction operation of a column layer included in an artificial neural network according to an example embodiment.
Figure 7:
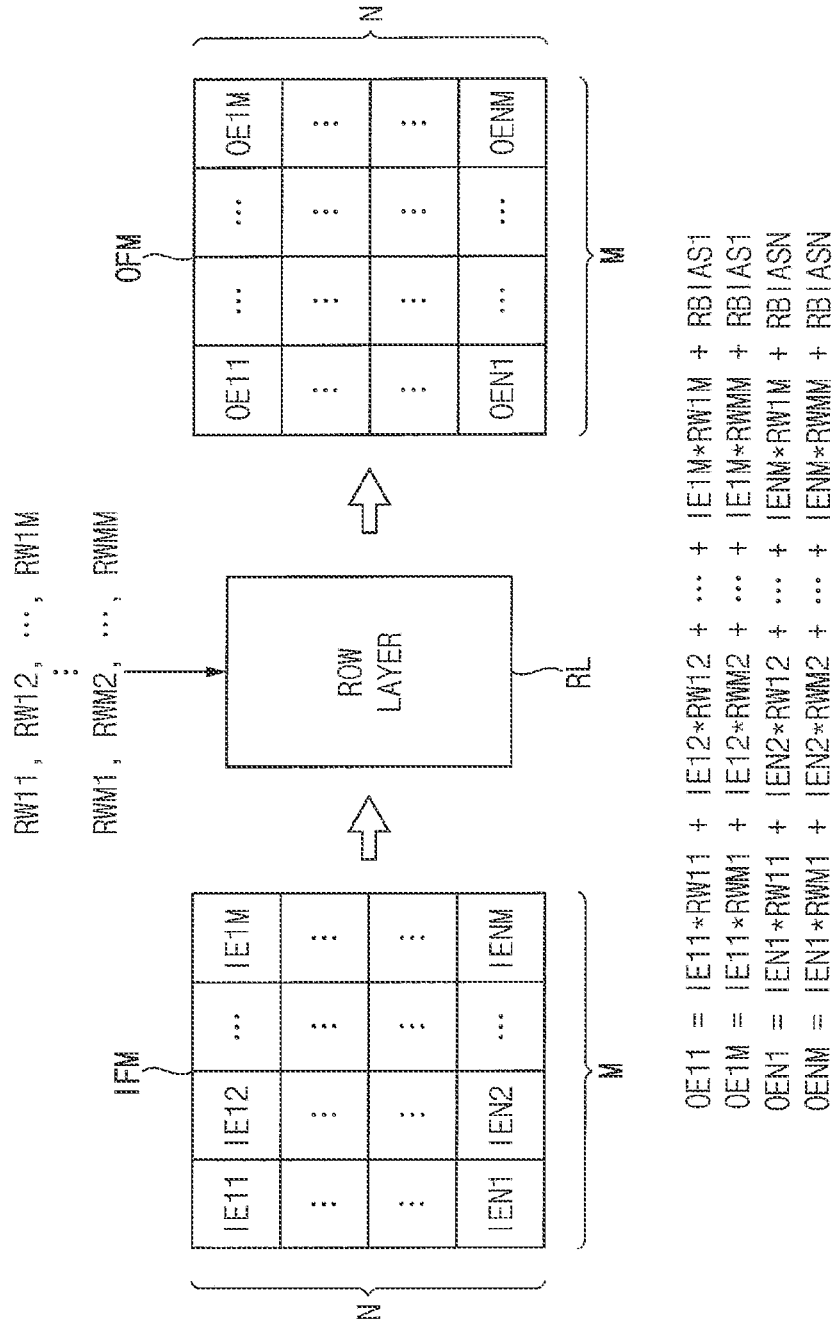
FIG. 7 is a diagram for describing an example of a row direction operation of a row layer included in an artificial neural network according to an example embodiment.
Figure 8:
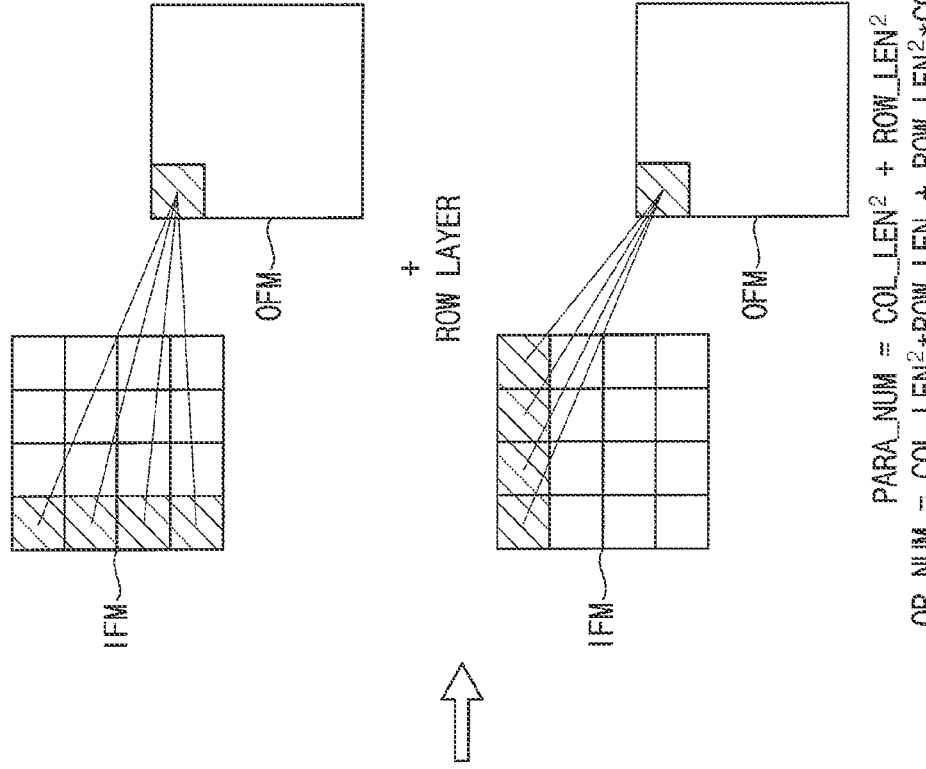
FIG. 8 is a diagram illustrating a column layer and a row layer according to an example embodiment.

FIG. 6 is a diagram for describing an example of a column direction operation of a column layer included in an artificial neural network according to an example embodiment, FIG. 7 is a diagram for describing an example of a row direction operation of a row layer included in an artificial neural network according to an example embodiment, and FIG. 8 is a diagram illustrating a column layer and a row layer according to an example embodiment.

Referring to FIGS. 1, 6, 7 and 8, an artificial neural network 150 of a display device 100 may include at least one column layer CL and at least one row layer RL.

The column layer CL may receive, as a parameter set PS, column weights CW11, CW12, . . . , CW1N, . . . , CWN1, CWN2, . . . , CWNN (or column weight parameters), and may generate an output feature map OFM by performing a column direction operation on an input feature map IFM based on the column weights CW11 through CWNN. For example, in a case where the input feature map IFM includes N rows and M columns, where N is an integer greater than 0, and M is an integer greater than 0, the column layer CL may receive $N^2$ column weights CW11 through CWNN. Thus, the number of the column weights CW11 through CWNN may correspond to a square of the number of the rows, or a square of a length of each column. Further, the column layer CL may generate a corresponding column of the output feature map OFM by performing a column direction weighted sum operation on each column of the input feature map IFM by using the column weights CW11 through CWNN, and thus may generate the output feature map OFM having N rows and M columns.

For example, as illustrated in FIG. 6, the column layer CL may generate an element OE11 in a first row and a first column of the output feature map OFM by summing products of elements IE11, IE21, . . . , IEN1 in a first column of the input feature map IFM and first column weights CW11, CW12, . . . , CW1N and a first column bias CBIAS1, or by using an equation "OE11=IE11*CW11+IE21*CW12+ . . . + IEN1*CW1N+CBIAS1", and may generate an element OEN1 in an N-th row and the first column of the output feature map OFM by summing products of the elements IE11, IE21, . . . , IEN1 in the first column of the input feature map IFM and N-th column weights CWN1, CWN2, . . . , CWNN and the first column bias CBIAS1, or by using an equation "OEN1=IE11*CWN1+IE21*CWN2+ . . . + IEN1*CWNN+CBIAS1". Similarly, the column layer CL may generate an element OE1M in the first row and an M-th column of the output feature map OFM by summing products of elements IE1M, IE2M, . . . , IENM in an M-th column of the input feature map IFM and the first column weights CW11, CW12, . . . , CW1N and an M-th column bias CBIASM, or by using an equation "OE1M=IE1M*CW11+IE2M*CW12+ . . . + IENM*CW1N+CBIASM", and may generate an element OENM in the N-th row and the M-th column of the output feature map OFM by summing products of the elements IE1M, IE2M, . . . , IENM in the M-th column of the input feature map IFM and the N-th column weights CWN1, CWN2, . . . , CWNN and the M-th column bias CBIASM, or by using an equation "OENM=IE1M*CWN1+ IE2M*CWN2+ . . . + IENM*CWNN+CBIASM".

The row layer RL may receive, as the parameter set PS, row weights RW11, RW12, . . . , RW1M, . . . , RWM1, RWM2, . . . , RWMM (or row weight parameters), and may generate an output feature map OFM by performing a row direction operation on an input feature map IFM based on the row weights RW11 through RWMM. For example, in a case where the input feature map IFM includes N rows and M columns, the row layer RL may receive $M^2$ row weights RW11 through RWMM. Thus, the number of the row weights RW11 through RWMM may correspond to a square of the number of the columns, or a square of a length of each row. Further, the row layer RL may generate a corresponding row of the output feature map OFM by performing a row direction weighted sum operation on each row of the input feature map IFM by using the row weights RW11 through RWMM, and thus may generate the output feature map OFM having N rows and M columns.

For example, as illustrated in FIG. 7, the row layer RL may generate an element OE11 in a first row and a first column of the output feature map OFM by summing products of elements IE11, IE12, . . . , IE1M in a first row of the input feature map IFM and first row weights RW11, RW12, . . . , RW1M and a first row bias RBIAS1, or by using an equation "OE11=IE11*RW11+IE12*RW12+ . . . + IE1M*RW1M+RBIAS1", and may generate an element OE1M in the first row and an M-th column of the output feature map OFM by summing products of the elements IE11, IE12, . . . , IE1M in the first row of the input feature map IFM and M-th row weights RWM1, RWM2, . . . , RWMM and the first row bias RBIAS1, or by using an equation "OE1M=IE11*RWM+IE12*RWM2+ . . . + IE1M*RWMM+RBIAS1". Similarly, the row layer RL may generate an element OEN1 in an N-th row and the first column of the output feature map OFM by summing products of elements IEN1, IEN2, . . . , IENM in an N-th row of the input feature map IFM and the first row weights RW11, RW12, . . . , RW1M and an N-th row bias RBIASN, or by using an equation "OEN1=IEN1*RW11+IEN2*RW12+ . . . + IENM*RW1M+RBIASN", and may generate an element OENM in the N-th row and the M-th column of the output feature map OFM by summing products of the elements IEN1, IEN2, . . . , IENM in the N-th row of the input feature map IFM and the M-th row weights RWM1, RWM2, . . . , RWMM and the N-th row bias RBIASN, or by using an equation "OENM=IEN1*RWM1+IEN2*RWM2+ . . . + IENM*RWMM+RBIASN".

As illustrated in FIG. 8, an artificial neural network may include a fully-connected layer that performs operations for all elements of an input feature map IFM and weight parameters to generate each element of an output feature map OFM. The fully-connected layer has a number of weight parameters and a number of operations. For example, the number PARA_NUM of the weight parameters of the fully-connected layer may correspond to a square of a product of a column length COL_LEN and a row length ROW_LEN, or "(COL_LEN*ROW_LEN)$^2$", and the number OP_NUM of the operations of the fully-connected layer also may correspond to the square of the product of the column length COL_LEN and the row length ROW_LEN, or "(COL_LEN*ROW_LEN)$^2$". However, the artificial neural network 150 of the display device 100 according to example embodiments may include the column layer CL and the row layer RL instead of the fully-connected layer, and thus the number of weights CW11 through CWNN and RW11 through RWMM or the number PARA_NUM of weight parameters may be reduced, and the number OP_NUM of operations may be reduced. For example, since the number PARA_NUM of the weight parameters of the column layer CL corresponds to the square of the row length ROW_LEN, and the number PARA_NUM of the weight parameters of the row layer RL corresponds to the square of the column length COL_LEN, the number PARA_NUM of the weight parameters of the column layer CL and the row layer RL may correspond to a sum of the square of the row length ROW_LEN and the square of the column length COL_LEN, or "COL_LEN$^2$+ROW_LEN$^2$", and thus may be reduced compared with the number PARA_NUM of the weight parameters of the fully-connected layer. Accordingly, a size of a memory storing the parameter set PS may be reduced in the display device 100. Further, since the number OP_NUM of the operations of the column layer CL corresponds to a first product of the square of the column length COL_LEN and the row length ROW_LEN, and the operations of the row layer RL corresponds to a second product of the square of the row length ROW_LEN and the column length COL_LEN, the number OP_NUM of the operations of the column layer CL and the row layer RL may correspond to a sum of the first product and the second product, or "COL_LEN$^2$*ROW_LEN+ROW_LEN$^2$*COL_LEN", and thus may be reduced compared with the number OP_NUM of the operations of the fully-connected layer. Accordingly, the number or an amount of the operations of the artificial neural network 150 of the display device 100 may be reduced.

To reduce the number PARA_NUM of the weight parameters and the number OP_NUM of the operations, another artificial neural network may include a locally-connected layer or a convolutional layer that performs operations on elements in an adjacent region of an input feature map IFM to generate each element of an output feature map OFM. In the locally-connected layer or the convolutional layer, since only adjacent elements of the input feature map IFM are considered in generating each element of the output feature map OFM, a noise for a touch sensor 120 caused by driving of a display panel 110 may not be accurately predicted. For example, due to coupling between any electrode of the display panel 110 and each driving line TXL of the touch sensor 120, a noise may occur along an extending direction (e.g., a column direction) of the driving line TXL in the touch sensor 120 by a voltage or a current at any position of the display panel 110. Further, due to coupling between any electrode of the display panel 110 and each sensing line RXL of the touch sensor 120, a noise may occur along an extending direction (e.g., a row direction) of the sensing line RXL in the touch sensor 120 by a voltage or a current at any position of the display panel 110. In the locally-connected layer or the convolutional layer, the noise along the column direction or the row direction may not be accurately predicted. However, the artificial neural network 150 of the display device 100 according to example embodiments may include the column layer CL performing the column direction operation and the row layer RL performing the row direction operation, and thus may accurately predict the noise along the column direction or the row direction. Thus, the display device 100 may include the artificial neural network 150 having the column and row layers CL and RL suitable for predicting the noise between the display panel 110 and the touch sensor 120.

Figure 9:
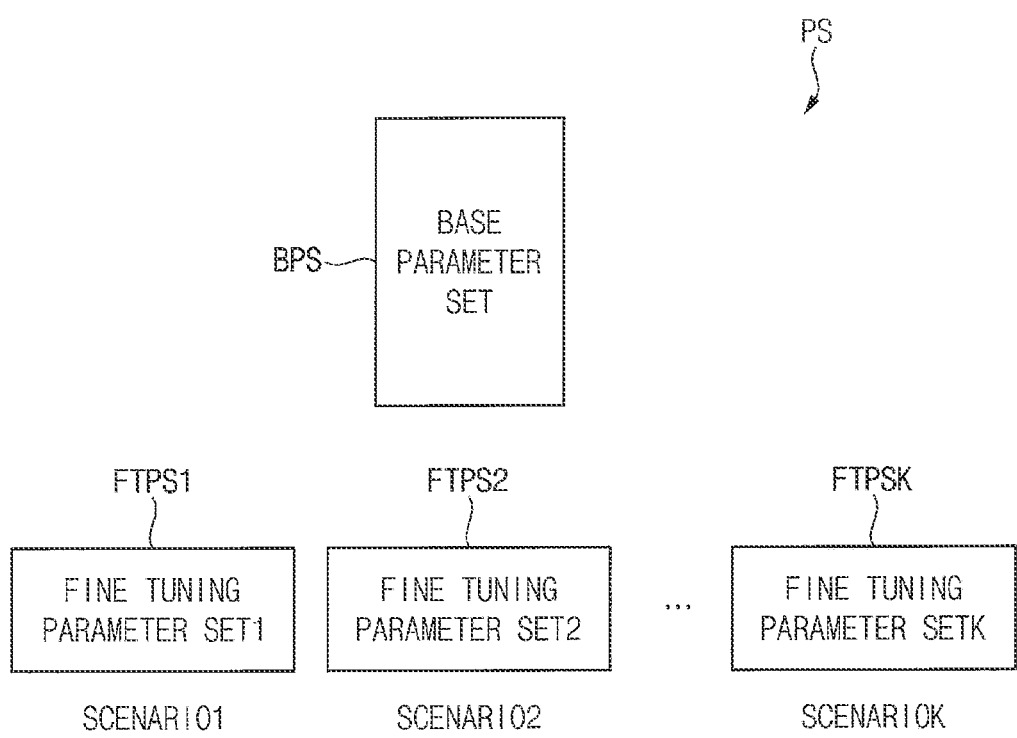
FIG. 9 is a diagram illustrating an example of a parameter set stored in a display device according to an example embodiment.

FIG. 9 is a diagram illustrating an example of a parameter set stored in a display device according to an example embodiment.

Referring to FIGS. 1 and 9, a parameter set PS stored in a display driver 130 may include a base parameter set BPS that is common to a plurality of scenarios SCENARIO1, SCENARIO2, ..., SCENARIOK, and a plurality of fine tuning parameter sets FTPS1, FTPS2, ..., FTPSK respectively corresponding to the plurality of scenarios SCENARIO1 through SCENARIOK. In some example embodiments, the plurality of scenarios SCENARIO1 through SCENARIOK may be different in at least one of a driving frequency of a display panel 110, a temperature of the display panel 110, a driving mode of the display panel 110, a driving mode of a touch sensor 120 and a calibration condition of the touch sensor 120 from each other. For example, the plurality of scenarios SCENARIO1 through SCENARIOK may include a default scenario and one or more additional scenarios. For example, the default scenario may be a scenario in which the driving frequency of the display panel 110 is about 60 Hz, and the additional scenarios may be scenarios having different driving frequencies.

The display driver 130 may select one scenario from the plurality of scenarios SCENARIO1 through SCENARIOK based on at least one of display driving information DDI and touch driving information TDI. For example, the display driver 130 may receive the display driving information DDI representing a current driving frequency of the display panel 110 and the touch driving information TDI representing a current calibration condition of the touch sensor 120, and may select one scenario from the plurality of scenarios SCENARIO1 through SCENARIOK according to the current driving frequency and the current calibration condition.

The display driver 130 may apply the base parameter set BPS to the artificial neural network 150, and may further apply one fine tuning parameter set corresponding to the selected one scenario among the plurality of fine tuning parameter sets FTPS1 through FTPSK to the artificial neural network 150. Further, the display driver 130 may generate predicted noise data PND suitable for the selected one scenario by applying a current map CM corresponding to input image data IDAT to the artificial neural network 150 having the base parameter set BPS and the one fine tuning parameter set.

In a case where the display driver 130 stores parameter sets PS respectively corresponding to the plurality of scenarios SCENARIO1 through SCENARIOK, a size of a memory storing the parameter sets PS may be excessively large. However, in the display device 100 according to an example embodiment, the display driver 130 may store the base parameter set BPS common to all the scenarios SCENARIO1 through SCENARIOK, and may further store the plurality of fine tuning parameter sets FTPS1 through FTPSK respectively corresponding to the plurality of scenarios SCENARIO1 through SCENARIOK. Accordingly, the number of parameters may be reduced, and a size of a memory storing the parameter set PS may be reduced. Further, even if a new scenario is added, since only a fine tuning parameter set corresponding to the new scenario is added, the memory sized may not be excessively increased, and the new scenario may be easily added.

Figure 10:
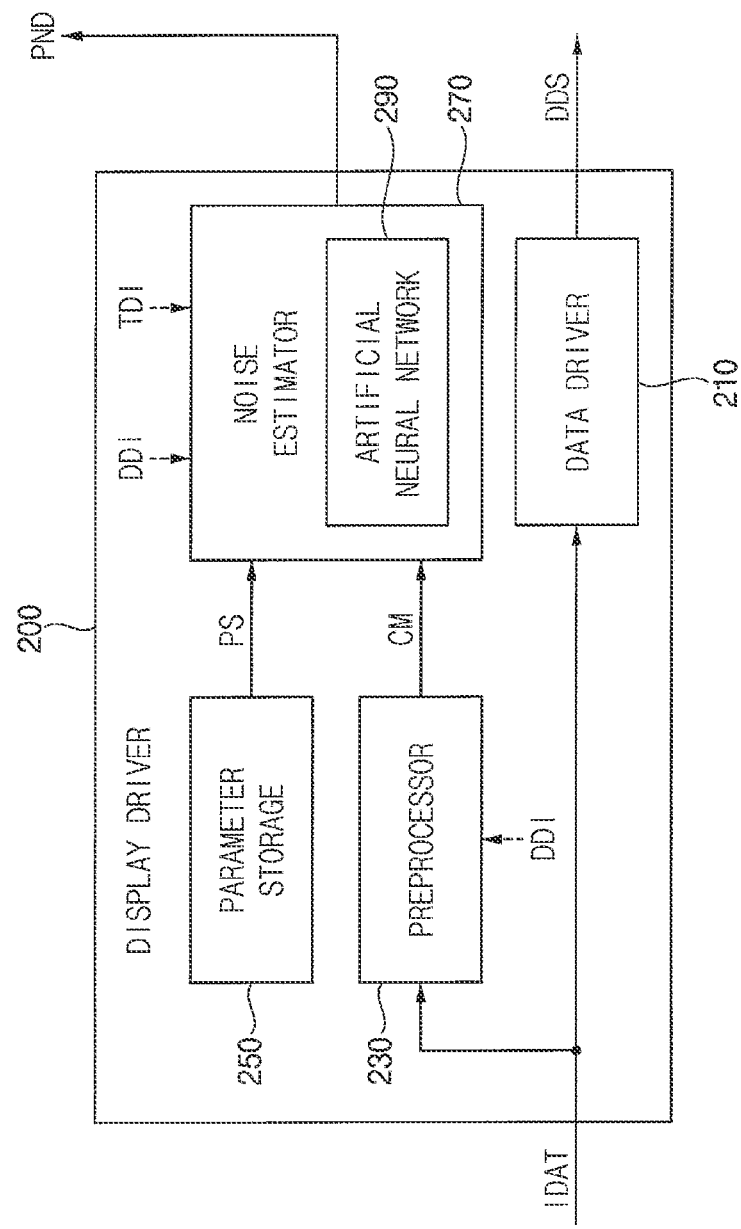
FIG. 10 is a block diagram illustrating a display driver according to an example embodiment.
Figure 11:
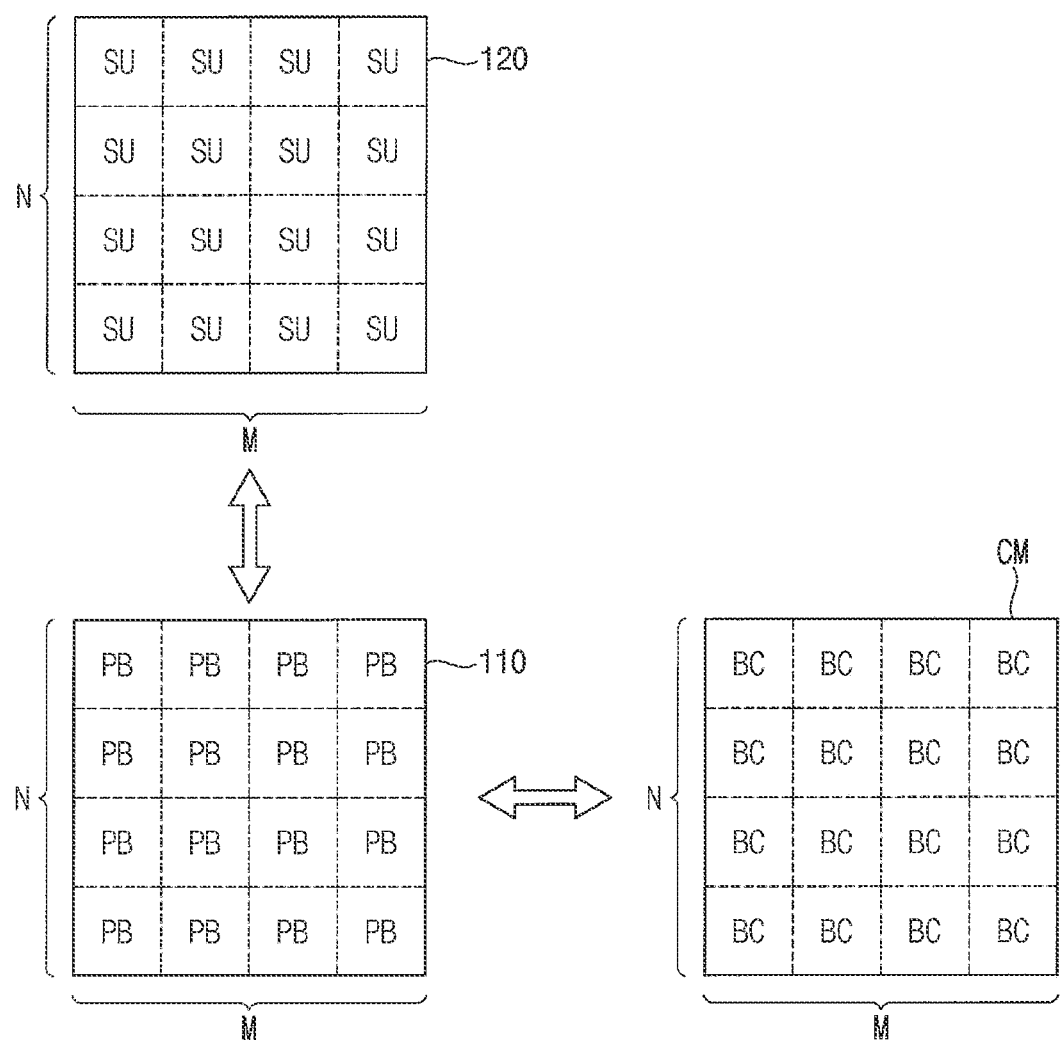
FIG. 11 is a diagram for describing an example of an operation of a preprocessor included in a display driver of FIG. 10.
Figure 12:
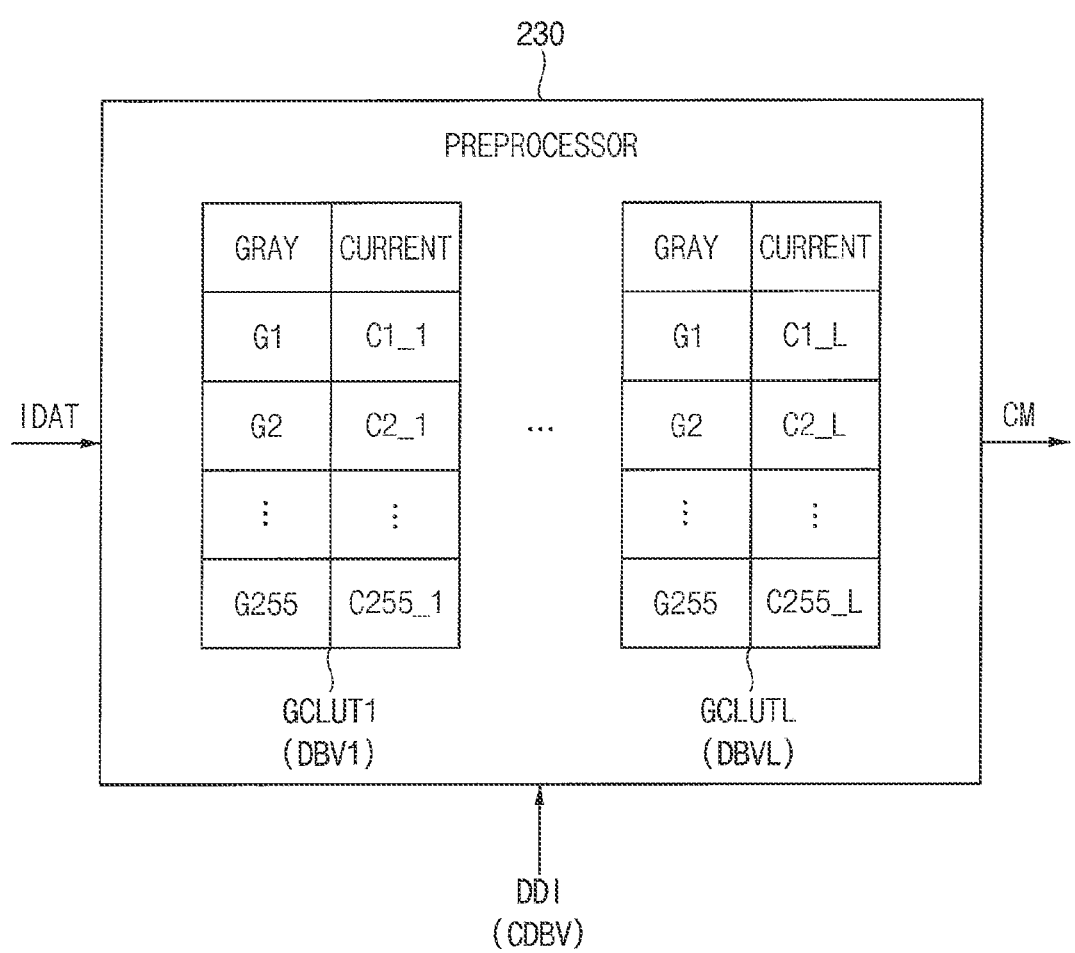
FIG. 12 is a block diagram illustrating an example of a preprocessor included in a display driver of FIG. 10.
Figure 13:
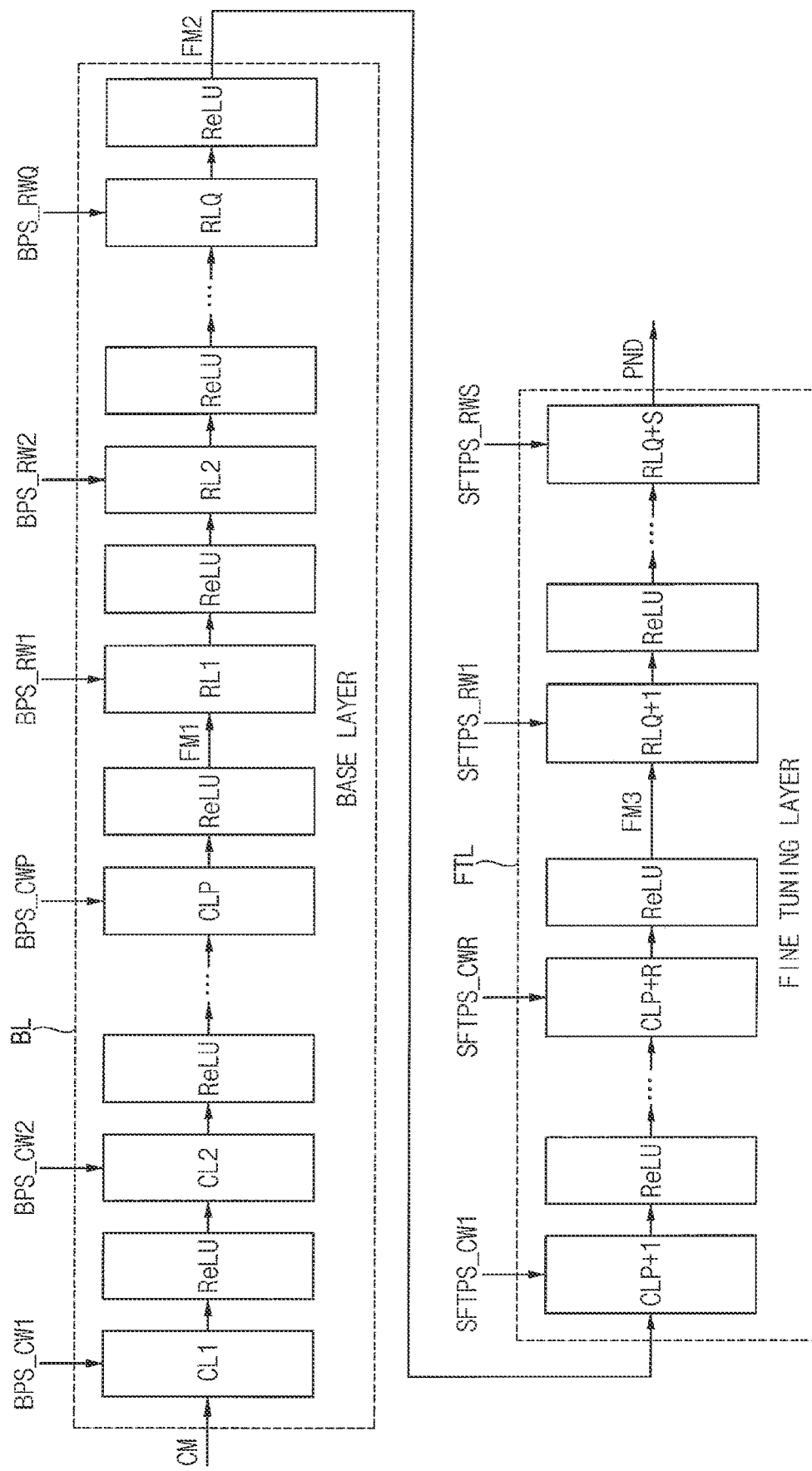
FIG. 13 is a block diagram illustrating an example of an artificial neural network included in a display driver of FIG. 10.

FIG. 10 is a block diagram illustrating a display driver according to example embodiments, FIG. 11 is a diagram for describing an example of an operation of a preprocessor included in a display driver of FIG. 10, FIG. 12 is a block diagram illustrating an example of a preprocessor included in a display driver of FIG. 10, and FIG. 13 is a block diagram illustrating an example of an artificial neural network included in a display driver of FIG. 10.

Referring to FIG. 10, a display driver 200 may include a data driver 210, a preprocessor 230, a parameter storage 250 and a noise estimator 270. The display driver 130 of FIG. 1 may be implemented by the display driver 200.

The data driver 210 may drive a display panel based on input image data IDAT. For example, the data driver 210 may generate a display driving signal DDS based on the input image data IDAT, and may provide the display driving signal DDS to the display panel.

The preprocessor 230 may convert the input image data IDAT into a current map CM. In some example embodiments, a resolution of the display panel, or the number of pixels may be greater than a resolution of a touch sensor, or the number of sensing units, and preprocessor 230 may group the pixels of the display panel into a plurality of pixel blocks corresponding to the sensing units. For example, as illustrated in FIG. 11, the preprocessor 230 may group the pixels of the display panel 110 into the pixel blocks PB respectively corresponding to the sensing units SU such that the number (e.g., N*M) of the pixel blocks PB of the display panel 110 is substantially the same as the number (e.g., N*M) of the sensing units SU of the touch sensor 120. Further, the preprocessor 230 may generate the current map CM representing block current amounts BC of the pixel blocks PB based on the input image data IDAT. For example, the preprocessor 230 may include a gray-current lookup table that stores a current amount of a pixel corresponding to each gray level, may convert the input image data IDAT representing gray levels with respect to respective pixels into a pixel current map representing current amounts with respect to the respective pixels by using the gray-current lookup table, and may generate the current map CM representing the block current amounts BC of the pixel blocks PB by calculating a sum or an average of the current amounts for the respective pixels in a unit of the pixel block PB. Accordingly, a resolution of the current map CM generated by the preprocessor 230 may be substantially the same as a resolution of touch sensing data generated by a touch controller.

In some example embodiments, the preprocessor 230 may generate the current map CM according to a brightness value (or a dimming value) of the display panel. For example, the preprocessor 230 may include a plurality of gray-current lookup tables GCLUT1, . . . , GCLUTL corresponding to a plurality of brightness values DVB1, . . . , DVBL. For example, a first gray-current lookup table GCLUT1 may store a plurality of current amounts C1_1, C2_1, . . . , C255_1 corresponding to a plurality of gray levels G1, G2, . . . , G255 at the display panel driven at a first brightness value DVB1. Further, an L-th gray-current lookup table GCLUTL may store a plurality of current amounts C1_L, C2_L, . . . , C255_L corresponding to the plurality of gray levels G1, G2, . . . , G255 at the display panel driven at an L-th brightness value DVB1, where L is an integer greater than 1. The preprocessor 230 may receive display driving information DDI representing a current brightness value CDBV, select one gray-current lookup table corresponding to the current brightness value CDBV from the plurality of gray-current lookup tables GCLUT1, . . . , GCLUTL, and may generate the current map CM corresponding to the input image data IDAT by using the selected one gray-current lookup table. In some example embodiments, the current map CM may represent the block current amounts BC of the pixel blocks PB as described above with reference to FIG. 11.

The parameter storage 250 may store a parameter set PS for an artificial neural network 290. In some example embodiments, as illustrated in FIG. 9, the parameter set PS stored in the parameter storage 250 may include a base parameter set BPS that is common to a plurality of scenarios SCENARIO1 through SCENARIOK, and a plurality of fine tuning parameter sets FTPS1 through FTPSK respectively corresponding to the plurality of scenarios SCENARIO1 through SCENARIOK.

The noise estimator 270 (e.g., a logic circuit) may include the artificial neural network 290, may apply the parameter set PS to the artificial neural network 290, and may generate predicted noise data PND by applying the current map CM to the artificial neural network 290. In some example embodiments, as illustrated in FIG. 13, the artificial neural network 290 may include a base layer BL to which the base parameter set BPS is applied, and a fine tuning layer FTL to which one fine tuning parameter set selected from the plurality of fine tuning parameter sets FTPS1 through FTPSK is applied.

The base layer BL may include one or more column layers CL1, CL2, . . . , CLP that generate a first feature map FM1 by performing a column direction weighted sum operation on the current map CM by using column weights BPS_CW1, BPS_CW2, . . . , BPS_CWP of the base parameter set BPS, and one or more row layers RL1, RL2, . . . , RLQ that generate a second feature map FM2 by performing a row direction weighted sum operation on the first feature map FM1 by using row weights BPS_RW1, BPS_RW2, . . . , BPS_RWQ of the base parameter set BPS. For example, as illustrated in FIG. 13, the base layer BL may include first through P-th column layers CL1, CL2, . . . , CLP, where P is an integer greater than 0. The first column layer CL1 may perform the column direction weighted sum operation illustrated in FIG. 6 by using a first column weight BPS_CW1 of the base parameter set BPS, the second column layer CL2 may perform the column direction weighted sum operation illustrated in FIG. 6 by using a second column weight BPS_CW2 of the base parameter set BPS, and the P-th column layer CLP may perform the column direction weighted sum operation illustrated in FIG. 6 by using a P-th column weight BPS_CWP of the base parameter set BPS. The base layer BL may further include first through Q-th row layers RL1, RL2, . . . , RLQ, where Q is an integer greater than 0. The first row layer RL1 may perform the row direction weighted sum operation illustrated in FIG. 7 by using a first row weight BPS_RW1 of the base parameter set BPS, the second row layer RL2 may perform the row direction weighted sum operation illustrated in FIG. 7 by using a second row weight BPS_RW2 of the base parameter set BPS, and the Q-th row layer RLQ may perform the row direction weighted sum operation illustrated in FIG. 7 by using a Q-th row weight BPS_RWQ of the base parameter set BPS.

The base layer BL may further include an activation unit that performs an activation function on an output feature map of each layer CL1 through CLP and RL1 through RLQ. In some example embodiments, as illustrated in FIG. 13, the base layer BL may further include rectified linear units ReLU that perform rectified linear operations on the output feature maps of the one or more column layers CL1 through CLP and the one or more row layers RL1 through RLQ. In some example embodiments, the rectified linear operation may be an operation that converts a negative value to a positive value, and may correspond to an equation "max(0, x)". For example, as illustrated in FIG. 13, the base layer BL may further include a first rectified linear unit ReLU that performs the rectified linear operation on the output feature map of the first column layer CL1, a second rectified linear unit ReLU that performs the rectified linear operation on the output feature map of the second column layer CL2, a P-th rectified linear unit ReLU that performs the rectified linear operation on the output feature map of the P-th column layer CLP, a (P+1)-th rectified linear unit ReLU that performs the rectified linear operation on the output feature map of the first row layer RL1, a (P+2)-th rectified linear unit ReLU that performs the rectified linear operation on the output feature map of the second row layer RL2, and a (P+Q)-th rectified linear unit ReLU that performs the rectified linear operation on the output feature map of the Q-th row layer RLQ.

The base layer BL may include any number of column layers and any number of row layers. Further, although FIG. 13 illustrates an example where the base layer BL includes the column and row layers in an order of the first column layer CL1, the second column layer CL2, the P-th column layer CL1, the first row layer RL1, the second row layer RL2 and the Q-th row layer RLQ, according to example embodiments, the base layer BL may include the column and row layers in any order.

The fine tuning layer FTL may include R column layers CLP+1, . . . , CLP+R that generate a third feature map FM3 by performing a column direction weighted sum operation on the second feature map FM2 by using column weights SFTPS_CW1, . . . , SFTPS_CWR of the selected one fine tuning parameter set, and S row layers RLQ+1, . . . , RLQ+S that generate the predicted noise data PND by performing a row direction weighted sum operation on the third feature map FM3 by using row weights SFTPS_RW1, . . . , SFTPS_RWS of the selected one fine tuning parameter set, where R is an integer greater 0, and S is an integer greater 0.

The fine tuning layer FTL may further include the activation unit that performs the activation function of an output feature map of each layer CLP+1, . . . , CLP+R, RLQ+1, . . . except for the last layer RLQ+S. In some example embodiments, as illustrated in FIG. 13, the fine tuning layer FTL may further include the rectified linear units ReLU that perform the rectified linear operations on the output feature maps of the layers CLP+1, . . . , CLP+R, RLQ+1, . . . except for the last layer RLQ+S.

The fine tuning layer FTL may include any number of column layers and any number of row layers. Further, although FIG. 13 illustrates an example where the fine tuning layer FTL includes the column and row layers in an order of the R column layers CLP+1, . . . , CLP+R and the S row layers RLQ+1, . . . , RLQ+S, according to example embodiments, the fine tuning layer FTL may include the column and row layers in any order.

The noise estimator 270 may select one scenario from the plurality of scenarios SCENARIO1 through SCENARIOK based on at least one of display driving information DDI and touch driving information TDI, may apply the base parameter set BPS to the base layer BL of the artificial neural network 290, and may apply the one fine tuning parameter set corresponding to the selected one scenario among the plurality of fine tuning parameter sets FTPS1 through FTPSK to the fine tuning layer FTL. Accordingly, the predicted noise data PND generated by the artificial neural network 290 of the noise estimator 270 may be suitable for the selected one scenario, and a noise represented by the predicted noise data PND may be accurate in various scenarios. Further, since the base parameter set BPS may be used with respect to various scenarios, a size of the parameter storage 250 storing the parameter set PS may be reduced.

Figure 14:
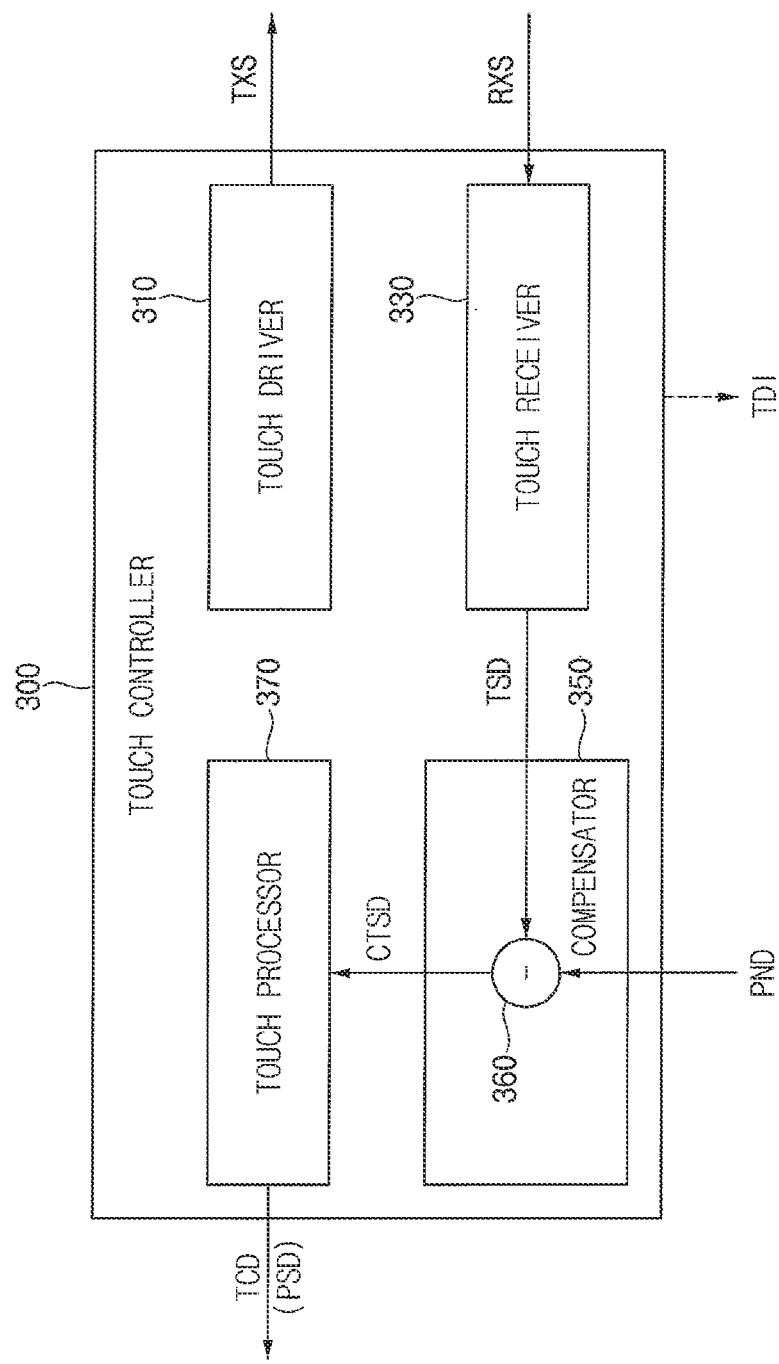
FIG. 14 is a block diagram illustrating a touch controller according to an example embodiment.
Figure 15:
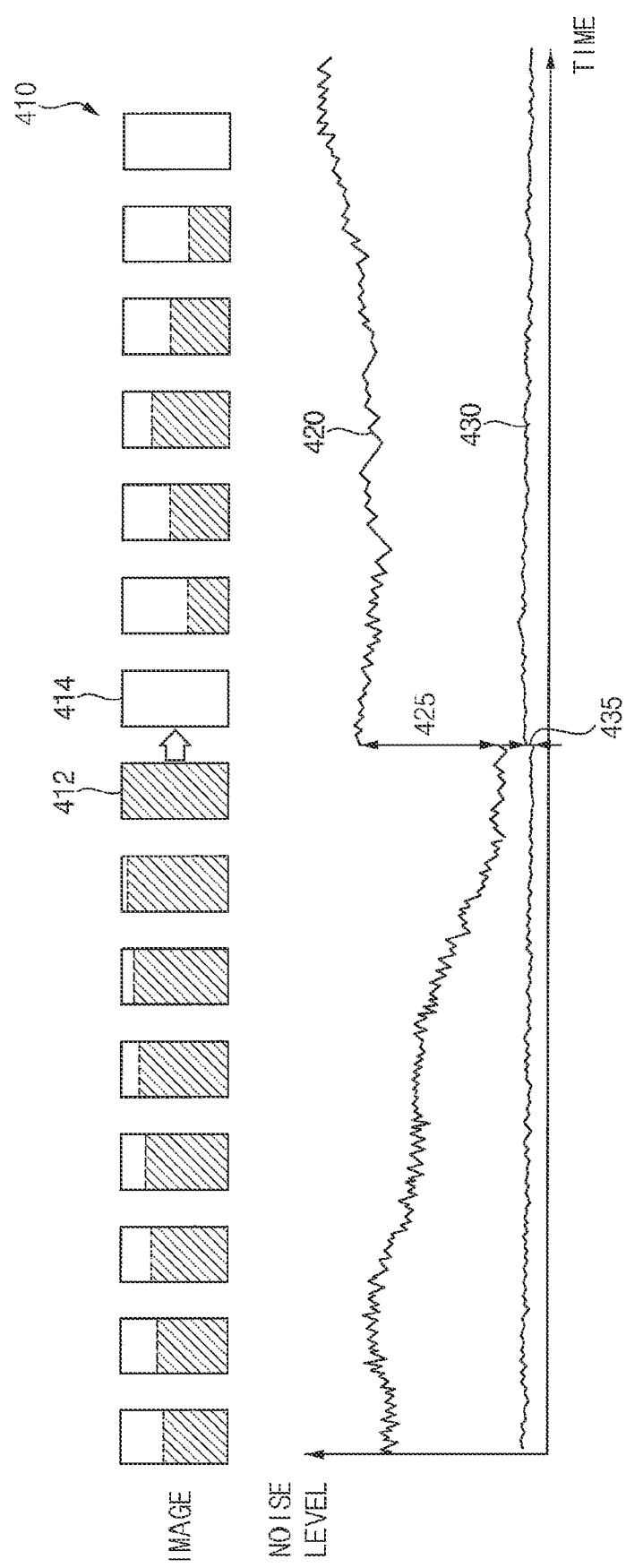
FIG. 15 is a diagram illustrating an example of a noise level of touch sensing data while a display panel is driven to display an image.

FIG. 14 is a block diagram illustrating a touch controller according to example an embodiment, and FIG. 15 is a diagram illustrating an example of a noise level of touch sensing data while a display panel is driven to display an image.

Referring to FIG. 14, a touch controller 300 may include a touch driver 310 (e.g., a driver circuit), a touch receiver 320, a compensator 350 (e.g., a logic circuit) and a touch processor 370. The toucher controller 170 of FIG. 1 may be implemented by the touch controller 300.

The touch driver 310 may provide a touch driving signal TXS to a plurality of driving lines of a touch sensor, and the touch receiver 330 may receive a touch sensing signal RXS from a plurality of sensing lines of the touch sensor. Further, the touch receiver 330 may convert the touch sensing signal RXS that is an analog signal into touch sensing data TSD that are digital data.

The compensator 350 may receive predicted noise data PND from a display driver, and may generate compensated touch sensing data CTSD by compensating the touch sensing data TSD based on the predicted noise data PND. In some example embodiments, to compensate the touch sensing data TSD based on the predicted noise data PND, the compensator 350 may include a subtractor 360 that generates the compensated touch sensing data CTSD by subtracting the predicted noise data PND from the touch sensing data TSD.

The touch processor 370 may generate touch coordinate data TCD representing a touch presence and/or a touch position based on the compensated touch sensing data CTSD. The compensated touch sensing data CTSD may have no or less noise component, and thus the touch coordinate data TCD may represent an accurate touch position.

In some example embodiments, the touch processor 370 may further generate proximity sensing data PSD representing a proximity of an object based on the compensated touch sensing data CTSD. Since the compensated touch sensing data CTSD have no noise component or less noise component, thus the proximity sensing data PSD may accurately represent the proximity of the object. For example, as illustrated in FIG. 15, touch sensing data TSD that are not compensated based on the predicted noise data PND may have a noise component 420, and a level of the noise component 420 may be changed according to images 410 displayed by a display panel. In particular, in a case where brightness is sharply changed between adjacent images 412 and 414, the noise component 420 of the touch sensing data TSD may be changed by a great level difference 425, and the touch processor 370 may generate wrong proximity sensing data PSD undesirably indicating the proximity of the object based on the level difference 425 of the noise component 420. However, the touch sensing data CTSD compensated based on the predicted noise data PND may have a noise component 430 having less fluctuation. Further, even if the brightness is sharply changed between the adjacent images 412 and 414, the noise component 430 of the compensated touch sensing data CTSD may be changed by a small level difference 435, and the touch processor 370 may generate accurate proximity sensing data PSD based on the compensated touch sensing data CTSD.

Figure 16:
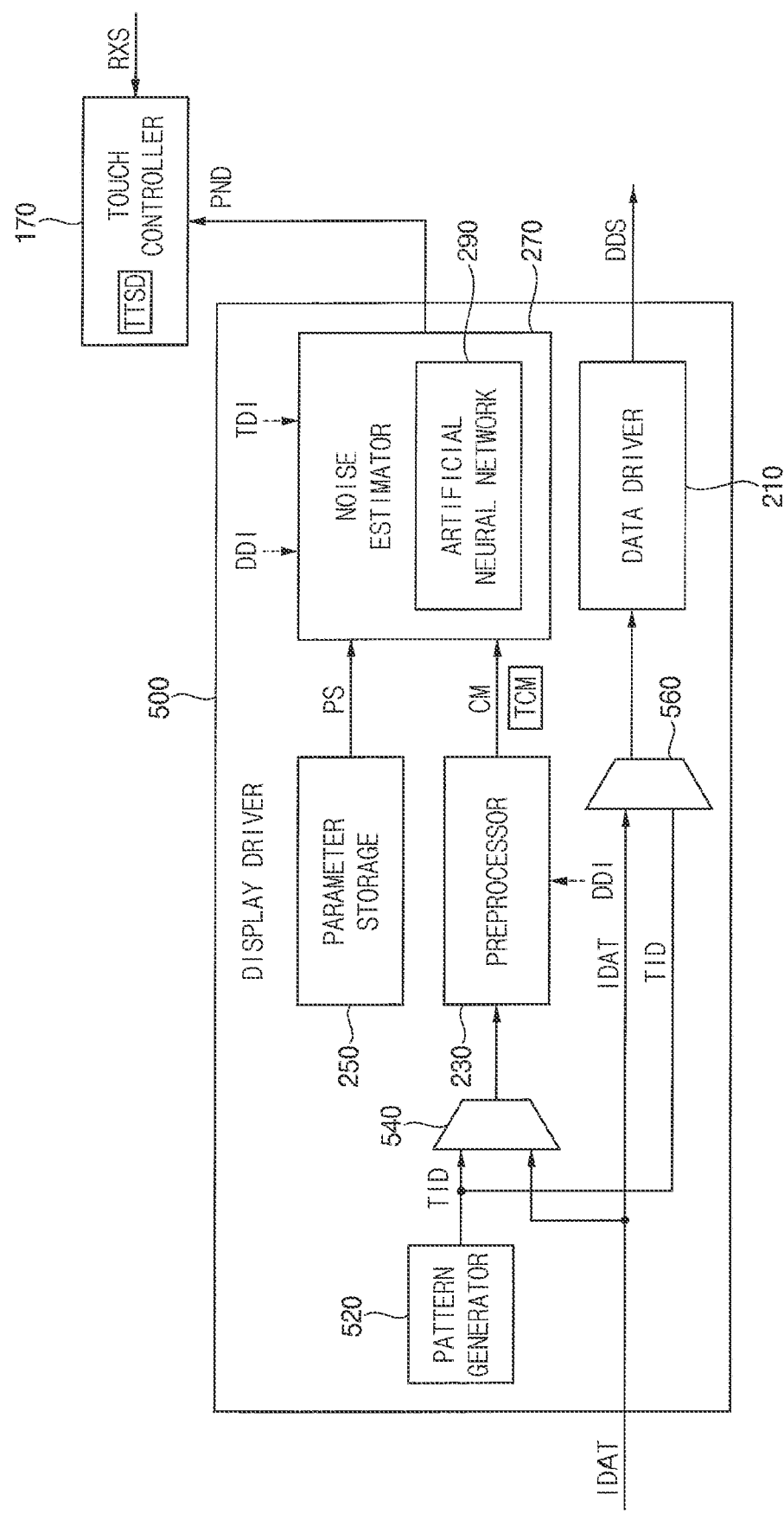
FIG. 16 is a block diagram illustrating a display driver according to an example embodiment.
Figure 17:
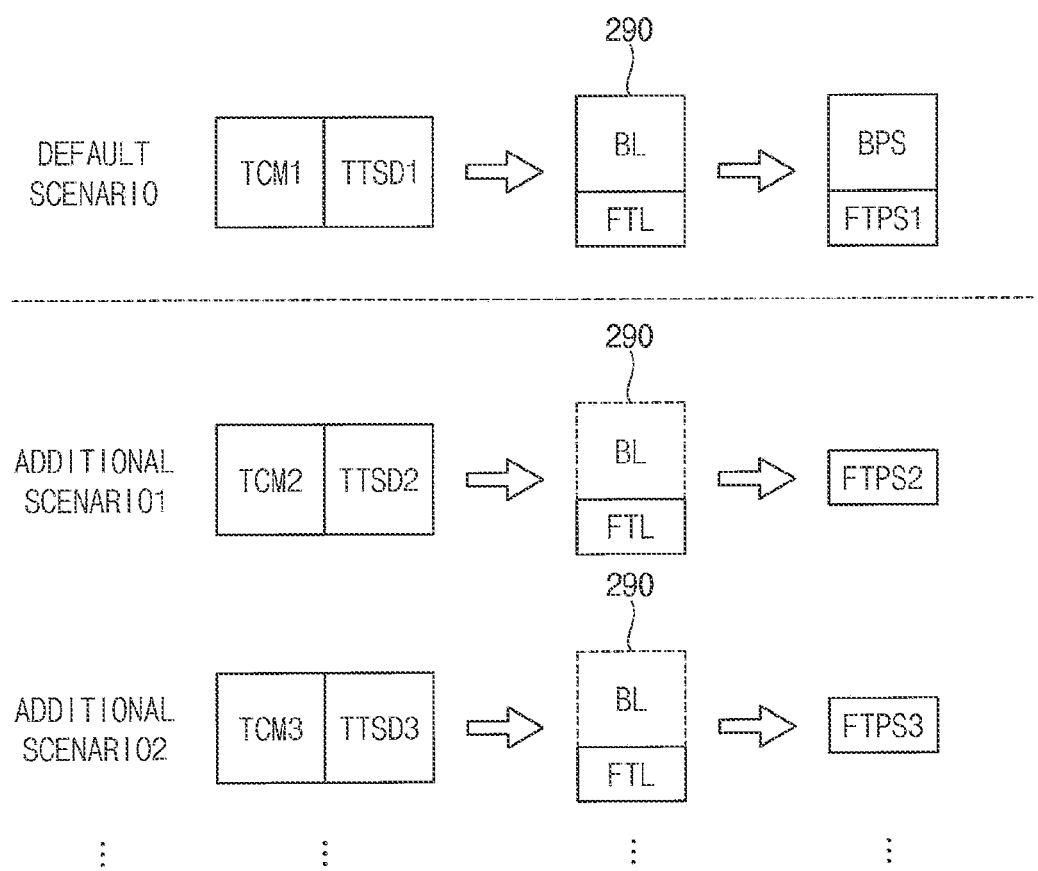
FIG. 17 is a diagram for describing an example where an artificial neural network is learned according to an example embodiment.

FIG. 16 is a block diagram illustrating a display driver according to an example embodiment, and FIG. 17 is a diagram for describing an example where an artificial neural network is learned according to example embodiments.

Referring to FIG. 16, a display driver 500 may include a data driver 210, a preprocessor 230, a parameter storage 250, a noise estimator 270 (e.g., a logic circuit), a pattern generator 520 (e.g., logic circuit), a first multiplexer 540 and a second multiplexer 560. The display driver 500 of FIG. 16 may have a similar configuration and a similar operation to a display driver 200 of FIG. 10, except that the display driver 500 may further include the pattern generator 520, the first multiplexer 540 and the second multiplexer 560.

The pattern generator 520 may generate training image data TID. The first multiplexer 540 may provide the training image data TID to the preprocessor 230 when the artificial neural network 290 is being trained, and may provide input image data IDAT to the preprocessor 230 when predicted noise data PND are generated. The second multiplexer 560 may provide the training image data TID to the data driver 210 when the artificial neural network 290 is being trained, and may provide the input image data IDAT to the data driver 210 when the predicted noise data PND are generated.

To train the artificial neural network 290, the preprocessor 230 may generate a training current map TCM corresponding to the training image data TID. Further, while a display panel is driven based on the training image data TID, a touch controller 170 may generate training touch sensing data TTSD in a state where no touch exists at a touch sensor. The training touch sensing data TTSD generated as described above may represent a noise in the touch sensor caused by driving of the display panel. The artificial neural network 290 may be trained based on the training current map TCM and the training touch sensing data TTSD to generate a parameter set PS. Since the artificial neural network 290 for predicting a noise of a display device is trained based on the training current map TCM and the training touch sensing data TTSD generated in the same display device, the artificial neural network 290 trained as described above may accurately predict the noise of the display device.

In some example embodiments, the artificial neural network 290 may be trained with respect to a plurality of scenarios, and the parameter set PS for the plurality of scenarios may be generated. For example, as illustrated in FIG. 17, the plurality of scenarios may include a default scenario and one or more additional scenarios, and the pattern generator 520 may sequentially generate first training image data for a default scenario and second and third training image data for first and second additional scenarios. The preprocessor 230 may generate a first training current map TCM1 corresponding to the first training image data and second and third training current map TCM2 and TCM3 corresponding to the second and third training image data. The touch controller 170 may generate first training touch sensing data TTSD1 corresponding to the first training current map TCM1 in a state where no touch exists at the touch sensor while the display panel is driven based on the first training image data. Further, while the display panel is driven based on each of the second and third training image data, the touch controller 170 may generate second and third training touch sensing data TTSD2 and TTSD3 respectively corresponding to the second and third training current maps TCM2 and TCM3 in the state where no touch exists at the touch sensor. A base layer BL and a fine tuning layer FTL of the artificial neural network 290 may be trained based on the first training current map TCM1 and the first training touch sensing data TTSD1 corresponding to the default scenario, and thus a base parameter set BPS and a first fine tuning parameter set FTPS1 corresponding to the default scenario may be generated. Thereafter, the base parameter set BPS may be applied to the base layer BL of the artificial neural network 290, the fine tuning layer FTL of the artificial neural network 290 may be re-trained based on the second training current map TCM2 and the second training touch sensing data TTSD2 corresponding to the first additional scenario, and thus a second fine tuning parameter set FTPS2 corresponding to the first additional scenario may be generated. Further, the fine tuning layer FTL of the artificial neural network 290 may be re-trained based on the third training current map TCM3 and the third training touch sensing data TTSD3 corresponding to the second additional scenario, and thus a third fine tuning parameter set FTPS3 corresponding to the second additional scenario may be generated. As described above, since the base layer BL is trained only with respect to the default scenario, a training time of the artificial neural network 290 may be shortened. Further, with respect to each additional scenario, since the parameter storage 250 stores only the fine tuning parameter set FTPS2 and FTPS3, a size of the parameter storage 250 may be reduced.

Figure 18:
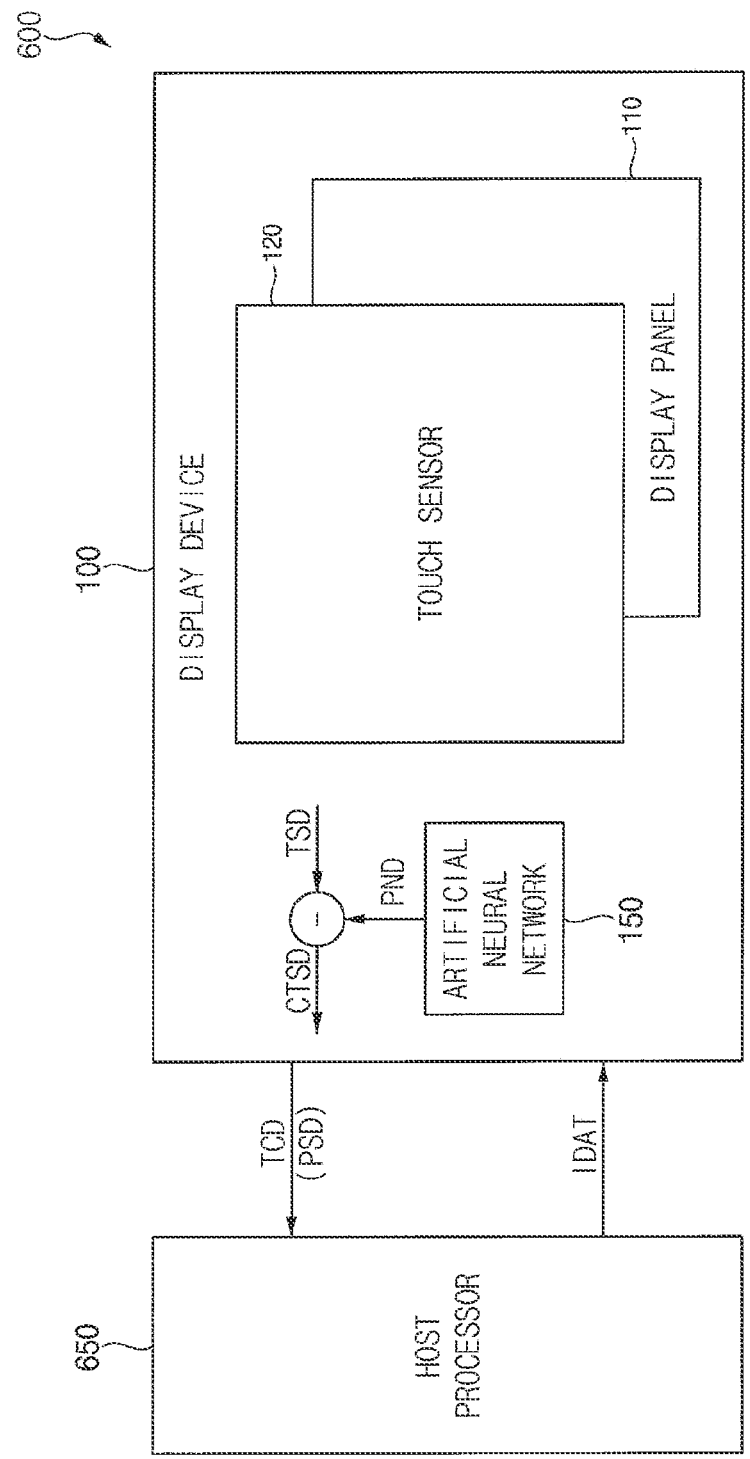
FIG. 18 is a block diagram illustrating a computing system according to an example embodiments.
Figure 19:
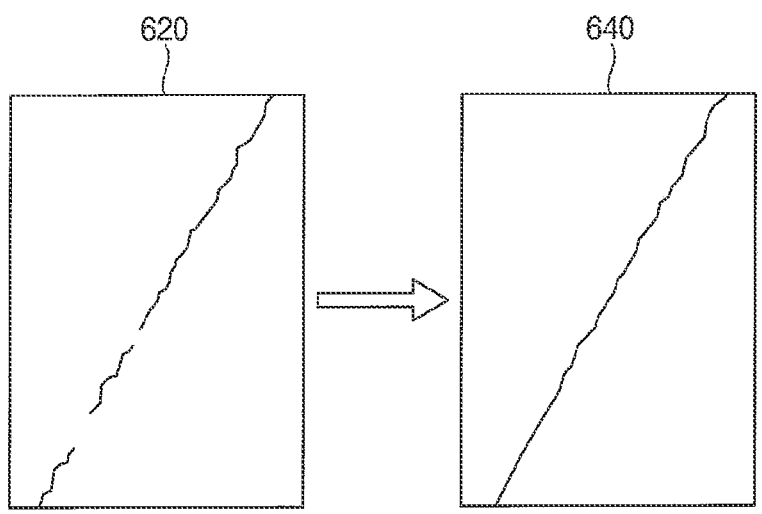
FIG. 19 is a diagram for describing an example where a computing system according to an example embodiment recognizes an active pen.

FIG. 18 is a block diagram illustrating a computing system according to example an embodiment, and FIG. 19 is a diagram for describing an example where a computing system according to an example embodiment recognizes an active pen.

Referring to FIG. 18, a computing system 600 may include a display device 100 and a host processor 650. The computing system 600 may be any electronic device including the display device 100. For example, the computing system 600 may be, but is not limited to, a mobile phone, a smart phone, a tablet computer, a digital television (TV), a 3D TV, a personal computer (PC), a home appliance, a laptop computer, a wearable device, an internet of things (IoT) device, an internet of everything (IoE) device, an e-book reader, a virtual reality (VR) device, an augmented reality (AR) device, a robotic device, a drone, etc.

The display device 100 may drive a display panel 110 to display an image based on input image data IDAT received from the host processor 650. According to an example embodiment, the host processor 650 may be, but is not limited to, an application processor (AP), a graphics processing unit (GPU), or a graphics card. The display device 100 may generate touch coordinate data TCD and/or proximity sensing data PSD by using a touch sensor 120, and may provide the touch coordinate data TCD and/or the proximity sensing data PSD to the host processor 650. The display device 100 may generate predicted noise data PND representing a noise for the touch sensor 120 caused by the driving of the display panel 110 by using an artificial neural network 150, and may compensate touch sensing data TSD of the touch sensor 120 based on the predicted noise data PND. The touch coordinate data TCD and/or the proximity sensing data PSD generated based on the compensated touch sensing data CTSD may be more accurate data.

In some example embodiments, the computing system 600 may recognize an active pen. For example, as illustrated in FIG. 19, in a case 620 where the touch sensing data TSD are not compensated based on the predicted noise data PND, a line recognized by the computing system 600 may be disconnected. However, in a case 640 where the touch sensing data TSD are compensated based on the predicted noise data PND, a line recognized by the computing system 600 may be substantially the same as a line drawn by the active pen.

Figure 20:
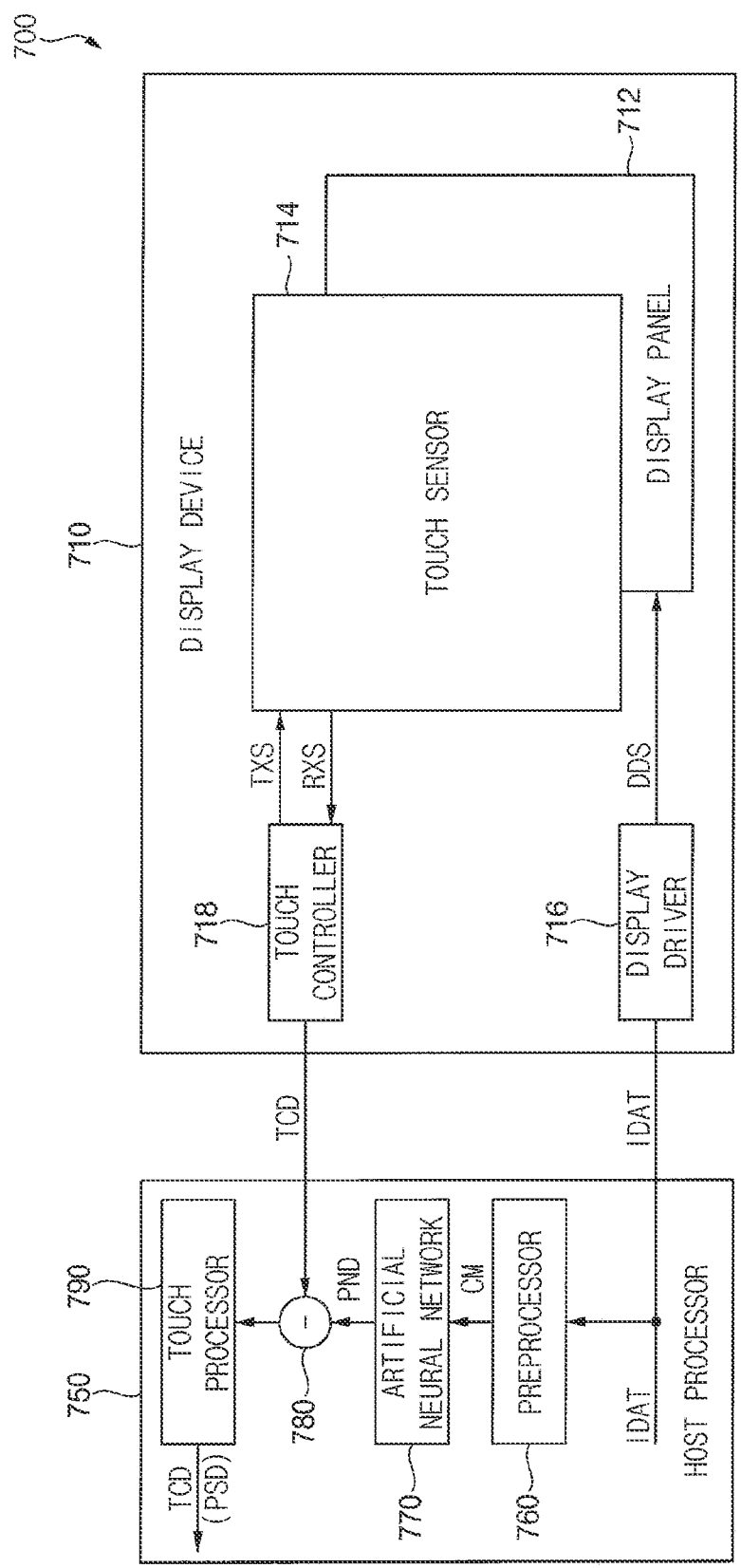
FIG. 20 is a block diagram illustrating a computing system according to an example embodiment.

FIG. 20 is a block diagram illustrating a computing system according to an example embodiment.

Referring to FIG. 20, a computing system 700 may include a display device 710 and a host processor 750. Unlike a computing system 600 of FIG. 18 in which a display device 100 predicts and removes a noise for a touch sensor 120, in the computing system 700 of FIG. 20, the host processor 750 may predict and remove a noise for a touch sensor 714.

The display device 710 may include a display panel 712, a display driver 716 that drives the display panel 712 based on input image data IDAT received from the host processor 750, the touch sensor 714, and a touch controller 718 that generates touch sensing data TSD by driving the touch sensor 714. The touch controller 718 may provide the touch sensing data TSD to the host processor 750.

The host processor 750 may include a preprocessor 760 that converts the input image data IDAT that are provided to the display device 710 into a current map CM. The host processor 750 may further include an artificial neural network 770, and may generate predicted noise data PND corresponding to the current map CM by using the artificial neural network 770. The host processor 750 may further include a compensator 780 that compensates the touch sensing data TSD based on the predicted noise data PND. For example, the compensator 780 may subtract the predicted noise data PND from the touch sensing data TSD. The host processor 750 may further include a touch processor 790 that generates touch coordinate data TCD and/or proximity sensing data PSD based on the touch sensing data TSD compensated based on the predicted noise data PND.

The inventive concept may be applied to various display devices or electronic devices including touch sensors. For example, the inventive concept may be applied to systems such as a personal computer (PC), a server computer, a data center, a workstation, a mobile phone, a smart phone, a tablet computer, a laptop computer, a personal digital assistant (PDA), a portable multimedia player (PMP), a digital camera, a portable game console, a music player, a camcorder, a video player, a navigation device, a wearable device, an IoT device, an IoE device, an e-book reader, a VR device, an AR device, a robotic device, a drone, etc.

The foregoing is illustrative of example embodiments and is not to be construed as limiting thereof. Although some example embodiments have been described, those skilled in the art will readily appreciate that many modifications are possible in the example embodiments without materially departing from the teachings of the example embodiments. Accordingly, all such modifications are intended to be included within the scope of the example embodiments as defined in the claims.

What is claimed is:

1. A display device comprising:
   a display panel;
   a touch sensor;
   a display driver configured to:
   drive the display panel based on input image data;
   convert the input image data into a current map;
   select one scenario from among a plurality of scenarios; and
   apply a base parameter set that is common to the scenarios, one fine tuning parameter set corresponding to the selected one scenario among a plurality of fine tuning parameter sets respectively corresponding to the plurality of scenarios, and the current map to an artificial neural network to generate predicted noise data; and
   a touch controller configured to receive a touch sensing signal from the touch sensor by driving the touch sensor, to convert the touch sensing signal into touch sensing data, and to compensate the touch sensing data based on the predicted noise data.

2. The display device of claim 1, wherein the artificial neural network included in the display driver includes:
   at least one column layer configured to perform a column direction operation; and
   at least one row layer configured to perform a row direction operation.

3. The display device of claim 1, wherein the display driver stores a parameter set for the artificial neural network and generates the predicted noise data by applying the current map to the artificial neural network having the parameter set.

4. The display device of claim 1, wherein the display driver is configured to:
   store the base parameter set that is common to the plurality of scenarios, and the plurality of fine tuning parameter sets respectively corresponding to the plurality of scenarios; and
   select the one scenario from the plurality of scenarios based on at least one of display driving information and touch driving information.

5. The display device of claim 1, wherein the display driver comprises:
   a data driver configured to generate a display driving signal based on the input image data, and to provide the display driving signal to the display panel;
   a preprocessor configured to convert the input image data into the current map;
   a storage device configured to store a parameter set for the artificial neural network; and
   a logic circuit including the artificial neural network, the logic circuit configured to apply the parameter set to the artificial neural network, and to generate the predicted noise data by applying the current map to the artificial neural network.

6. The display device of claim 5, wherein the touch sensor includes a plurality of driving lines and a plurality of sensing lines, and has a plurality of sensing units defined by the plurality of driving lines and the plurality of sensing lines, and wherein the preprocessor groups a plurality of pixels of the display panel into a plurality of pixel blocks corresponding to the plurality of sensing units, and generates the current map representing block current amounts of the plurality of pixel blocks based on the input image data.

7. The display device of claim 5, wherein the preprocessor comprises:
   a plurality of gray-current lookup tables corresponding to a plurality of brightness values, and wherein the preprocessor receives display driving information representing a current brightness value, selects one gray-current lookup table corresponding to the current brightness value from the plurality of gray-current lookup tables, and generates the current map corresponding to the input image data by using the one gray-current lookup table.

8. The display device of claim 5, wherein the parameter set stored in the storage device comprises:
   the base parameter set that is common to the plurality of scenarios; and
   the plurality of fine tuning parameter sets respectively corresponding to the plurality of scenarios, and
   wherein the artificial neural network comprises:
   a base layer to which the base parameter set is applied; and
   a fine tuning layer to which the one fine tuning parameter set selected from the plurality of fine tuning parameter sets is applied.

9. The display device of claim 8, wherein the base layer comprises:
  one or more column layers configured to generate a first feature map by performing a column direction weighted sum operation on the current map by using column weights of the base parameter set; and
  one or more row layers configured to generate a second feature map by performing a row direction weighted sum operation on the first feature map by using row weights of the base parameter set.

10. The display device of claim 9, wherein the base layer further comprises: rectified linear units configured to perform rectified linear operations on output feature maps of the one or more column layers and the one or more row layers.

11. The display device of claim 9, wherein the fine tuning layer comprises:
  one or more column layers configured to generate a third feature map by performing a column direction weighted sum operation on the second feature map by using column weights of the one fine tuning parameter set; and
  one or more row layers configured to generate the predicted noise data by performing a row direction weighted sum operation on the third feature map by using row weights of the one fine tuning parameter set.

12. The display device of claim 8, wherein the logic circuit is configured to:
  select the one scenario from the plurality of scenarios based on at least one of display driving information and touch driving information;
  apply the base parameter set to the base layer; and
  apply the one fine tuning parameter set corresponding to the one scenario among the plurality of fine tuning parameter sets to the fine tuning layer.

13. The display device of claim 5, wherein the display driver further comprises:
  a first multiplexer configured to provide training image data to the preprocessor when the artificial neural network is trained, and to provide the input image data to the preprocessor when the predicted noise data is generated; and
  a second multiplexer configured to provide the training image data to the data driver when the artificial neural network is trained, and to provide the input image data to the data driver when the predicted noise data is generated.

14. The display device of claim 13, wherein the preprocessor generates a training current map corresponding to the training image data, wherein, while the display panel is driven based on the training image data, the touch controller generates training touch sensing data in a state where no touch exists at the touch sensor, and wherein the artificial neural network is trained based on the training current map and the training touch sensing data to generate the parameter set.

15. The display device of claim 13, wherein the artificial neural network comprises a base layer and a fine tuning layer, wherein the pattern generator generates first training image data for a default scenario and at least one second training image data for at least one additional scenario, wherein the preprocessor generates a first training current map corresponding to the first training image data and a second training current map corresponding to the second training image data, wherein the touch controller generates first training touch sensing data corresponding to the first training current map in a state where no touch exists at the touch sensor while the display panel is driven based on the first training image data, and generates second training touch sensing data corresponding to the second training current map in the state where no touch exists at the touch sensor while the display panel is driven based on the second training image data, wherein the base layer and the fine tuning layer are trained based on the first training current map and the first training touch sensing data to generate the base parameter set and a first fine tuning parameter set for the default scenario, and wherein the fine tuning layer is re-trained based on the second training current map and the second training touch sensing data to generate a second fine tuning parameter set for the additional scenario.

16. The display device of claim 1, wherein the touch sensor includes a plurality of driving lines and a plurality of sensing lines, and the touch controller comprises:
  a touch driver configured to provide a touch driving signal to the plurality of driving lines;
  a touch receiver configured to receive the touch sensing signal from the plurality of sensing lines, and to convert the touch sensing signal into the touch sensing data;
  a compensator configured to receive the predicted noise data from the display driver, and to compensate the touch sensing data based on the predicted noise data; and
  a touch processor configured to generate touch coordinate data representing a touch position based on the compensated touch sensing data.

17. The display device of claim 16, wherein the compensator compensates the touch sensing data by subtracting the predicted noise data from the touch sensing data.

18. The display device of claim 16, wherein the touch processor further generates proximity sensing data representing a proximity of an object based on the compensated touch sensing data.

19. A display device comprising:
  a display panel including a plurality of pixels;
  a touch sensor including a plurality of driving lines and a plurality of sensing lines;
  a display driver configured to drive the display panel based on input image data; and
  a touch controller configured to drive the touch sensor,
  wherein the display driver comprises:
    a data driver configured to generate a display driving signal based on the input image data, and to provide the display driving signal to the display panel;
    a preprocessor configured to group the plurality of pixels into a plurality of pixel blocks corresponding to a plurality of sensing units defined by the plurality of driving lines and the plurality of sensing lines, and to generate a current map representing block current amounts of the plurality of pixel blocks based on the input image data;
    a storage device configured to store a base parameter set that is common to a plurality of scenarios, and a plurality of fine tuning parameter sets respectively corresponding to the plurality of scenarios; and
    a logic circuit including an artificial neural network having a base layer and a fine tuning layer, the logic circuit configured to select one scenario from the plurality of scenarios based on at least one of display driving information and touch driving information, to apply the base parameter set to the base layer, to apply one of the fine tuning parameter sets corresponding to the one scenario to the fine tuning layer, and to generate predicted noise data by applying the current map to the artificial neural network, and wherein the touch controller comprises:
  a touch driver configured to provide a touch driving signal to the plurality of driving lines;
  a touch receiver configured to receive a touch sensing signal from the plurality of sensing lines, and to convert the touch sensing signal into the touch sensing data;
  a compensator configured to receive the predicted noise data from the display driver, and to compensate the touch sensing data based on the predicted noise data; and
  a touch processor configured to generate touch coordinate data representing a touch position based on the compensated touch sensing data.

20. A computing system comprising:
a display device configured to display an image based on input image data, and to generate touch sensing data; and
a host processor configured to provide the input image data to the display device, and to receive the touch sensing data from the display device,
wherein the host processor is further configured to:
  convert the input image data into a current map;
  select one scenario from among a plurality of scenarios; and
  apply a base parameter set that is common to the scenarios, one fine tuning parameter set corresponding to the selected one scenario among a plurality of fine tuning parameter sets respectively corresponding to the plurality of scenarios, and the current map to an artificial neural network to generate predicted noise data; and
  compensate the touch sensing data based on the predicted noise data.

* * * * *